US011945582B2

(12) United States Patent
Ali et al.

(10) Patent No.: US 11,945,582 B2
(45) Date of Patent: Apr. 2, 2024

(54) COORDINATING AN AERIAL SEARCH AMONG UNMANNED AERIAL VEHICLES

(71) Applicant: SKYGRID, LLC, Austin, TX (US)

(72) Inventors: Syed Mohammad Ali, Leander, TX (US); Lowell L Duke, Austin, TX (US); Zehra Akbar, Leander, TX (US); Syed Mohammad Amir Husain, Georgetown, TX (US); Taylor R. Schmidt, Austin, TX (US)

(73) Assignee: SKYGRID, LLC, Austin, TX (US)

( * ) Notice: Subject to any disclaimer, the term of this patent is extended or adjusted under 35 U.S.C. 154(b) by 257 days.

(21) Appl. No.: 17/208,565

(22) Filed: Mar. 22, 2021

(65) Prior Publication Data

US 2021/0300555 A1 Sep. 30, 2021

Related U.S. Application Data

(60) Provisional application No. 63/002,689, filed on Mar. 31, 2020.

(51) Int. Cl.
*B64C 39/02* (2023.01)
*B64U 101/00* (2023.01)
*G08G 5/00* (2006.01)

(52) U.S. Cl.
CPC ......... *B64C 39/024* (2013.01); *G08G 5/0008* (2013.01); *G08G 5/0013* (2013.01); *G08G 5/0043* (2013.01); *G08G 5/0069* (2013.01); *B64U 2101/00* (2023.01); *B64U 2201/102* (2023.01)

(58) Field of Classification Search
None
See application file for complete search history.

(56) References Cited

U.S. PATENT DOCUMENTS

2014/0316616 A1* 10/2014 Kugelmass ............ G05D 1/104
701/8

FOREIGN PATENT DOCUMENTS

KR 1020180003895 A 1/2018

OTHER PUBLICATIONS

M. Aljehani and M. Inoue, "Performance Evaluation of Multi-UAV System in Post-Disaster Application: Validated by HITL Simulator," in IEEE Access, vol. 7, pp. 64386-64400, 2019, doi: 10.1109/ACCESS.2019.2917070. (Year: 2019).*
Cabreira, T.M.; Brisolara, L.B.; Ferreira Jr., P.R. Survey on Coverage Path Planning with Unmanned Aerial Vehicles. Drones 2019, 3, 4. https://doi.org/10.3390/drones3010004 (Year: 2019).*
International Search Report and Written Opinion, PCT/US2021/023480, dated Nov. 29, 2021, 10 pages.

* cited by examiner

*Primary Examiner* — Maceeh Anwari
*Assistant Examiner* — Charles Pall

(57) ABSTRACT

In a particular embodiment, coordinating an aerial search among unmanned aerial vehicles is disclosed that includes receiving, by a server in a UAV transportation ecosystem, search area data, accessing, by the server, UAV parameters for a type of UAV, determining, by the server in dependence upon the search area data and the UAV parameters, a number of UAVs needed to complete a coordinated aerial search of a search area within a time limit, and partitioning, by the server, the search area into a plurality of partitions, wherein the number of partitions is equal to the number of UAVs.

11 Claims, 16 Drawing Sheets

COORDINATING AN AERIAL SEARCH AMONG UNMANNED AERIAL VEHICLES

CROSS-REFERENCE TO RELATED APPLICATION

This application is a non-provisional application for patent entitled to a filing date and claiming the benefit of earlier-filed U.S. Provisional Patent Application Ser. No. 63/002,689, filed Mar. 31, 2020.

BACKGROUND

An Unmanned Aerial Vehicle (UAV) is a term used to describe an aircraft with no pilot on-board the aircraft. The use of UAVs is growing in an unprecedented rate, and it is envisioned that UAVs will become commonly used for package delivery and passenger air taxis. However, as UAVs become more prevalent in the airspace, there is a need to regulate air traffic and ensure the safe navigation of the UAVs.

The Unmanned Aircraft System Traffic Management (UTM) is an initiative sponsored by the Federal Aviation Administration (FAA) to enable multiple beyond visual line-of-sight drone operations at low altitudes (under 400 feet above ground level (AGL)) in airspace where FAA air traffic services are not provided. However, a framework that extends beyond the 400 feet AGL limit is needed. For example, unmanned aircraft that would be used by package delivery services and air taxis may need to travel at altitudes above 400 feet. Such a framework requires technology that will allow the FAA to safely regulate unmanned aircraft.

SUMMARY

In an embodiment, a method for coordinating an aerial search among unmanned aerial vehicles is disclosed that includes receiving, by a device in a UAV transportation ecosystem, search area data; accessing UAV parameters for a type of UAV; determining, in dependence upon the search area data and the UAV parameters, a number of UAVs needed to complete a coordinated aerial search of a search area within a time limit; and partitioning the search area into a plurality of partitions, wherein the number of partitions is equal to the number of UAVs.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
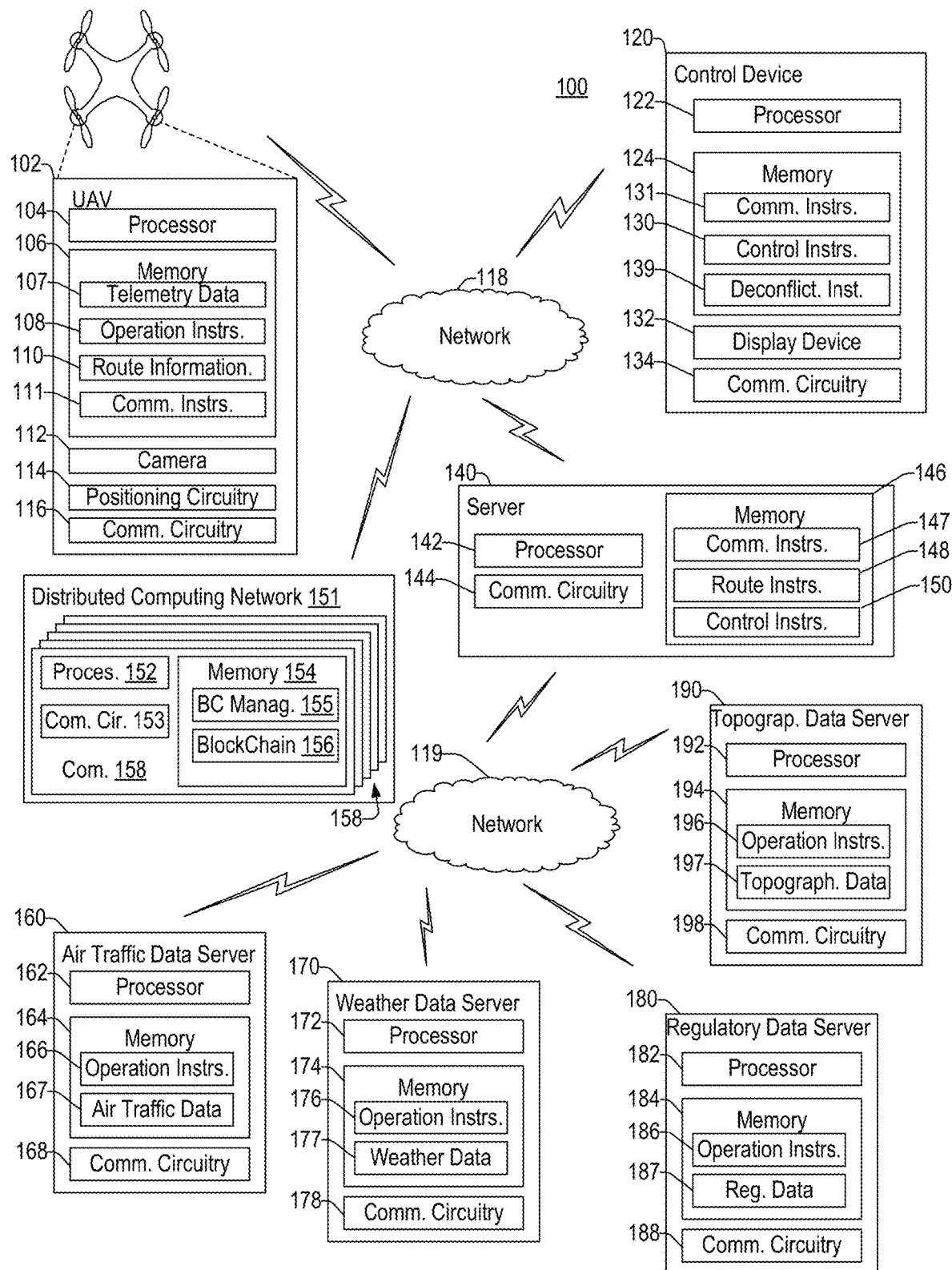
FIG. 1 is a block diagram illustrating a particular implementation of a system for coordinating an aerial search among unmanned aerial vehicles.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Exemplary methods, apparatuses, and computer program products for coordinating an aerial search among unmanned aerial vehicles in accordance with the present invention are described with reference to the accompanying drawings, beginning with FIG. 1. FIG. 1 sets forth a diagram of a system (100) configured for coordinating an aerial search among unmanned aerial vehicles according to embodiments of the present disclosure. The system (100) of FIG. 1 includes an unmanned aerial vehicle (UAV) (102), a control device (120), a server (140), a distributed computing network (151), an air traffic data server (160), a weather data server (170), a regulatory data server (180), and a topographical data server (190).

A UAV, commonly known as a drone, is a type of powered aerial vehicle that does not carry a human operator and uses aerodynamic forces to provide vehicle lift. UAVs are a component of an unmanned aircraft system (UAS), which typically include at least a UAV, a control device, and a system of communications between the two. The flight of a UAV may operate with various levels of autonomy including under remote control by a human operator or autonomously by onboard or ground computers. Although a UAV may not include a human operator pilot, some UAVs, such as passenger drones (drone taxi, flying taxi, or pilotless helicopter) carry human passengers.

For ease of illustration, the UAV (102) is illustrated as one type of drone. However, any type of UAV may be used in accordance with embodiments of the present disclosure and unless otherwise noted, any reference to a UAV in this application is meant to encompass all types of UAVs. Readers of skill in the art will realize that the type of drone that is selected for a particular mission or excursion may depend on many factors, including but not limited to the type of payload that the UAV is required to carry, the distance that the UAV must travel to complete its assignment, and the types of terrain and obstacles that are anticipated during the assignment.

In FIG. 1, the UAV (102) includes a processor (104) coupled to a memory (106), a camera (112), positioning circuitry (114), and communication circuitry (116). The communication circuitry (116) includes a transmitter and a receiver or a combination thereof (e.g., a transceiver). In a particular implementation, the communication circuitry (116) (or the processor (104)) is configured to encrypt outgoing message(s) using a private key associated with the UAV (102) and to decrypt incoming message(s) using a public key of a device (e.g., the control device (120) or the server (140)) that sent the incoming message(s). As will be explained further below, the outgoing and incoming messages may be transaction messages that include information associated with the UAV. Thus, in this implementation, communications between the UAV (102), the control device (120), and the server (140) are secure and trustworthy (e.g., authenticated).

The camera (112) is configured to capture image(s), video, or both, and can be used as part of a computer vision system. For example, the camera (112) may capture images or video and provide the video or images to a pilot of the UAV (102) to aid with navigation. Additionally, or alternatively, the camera (112) may be configured to capture images or video to be used by the processor (104) during performance of one or more operations, such as a landing operation, a takeoff operation, or object/collision avoidance, as non-limiting examples. Although a single camera (112) is shown in FIG. 1, in alternative implementations more and/or different sensors may be used (e.g., infrared, LIDAR, SONAR, etc.).

The positioning circuitry (114) is configured to determine a position of the UAV (102) before, during, and/or after flight. For example, the positioning circuitry (114) may include a global positioning system (GPS) interface or sensor that determines GPS coordinates of the UAV (102). The positioning circuitry (114) may also include gyroscope(s), accelerometer(s), pressure sensor(s), other sensors, or a combination thereof, that may be used to determine the position of the UAV (102).

The processor (104) is configured to execute instructions stored in and retrieved from the memory (106) to perform various operations. For example, the instructions include operation instructions (108) that include instructions or code that cause the UAV (102) to perform flight control operations. The flight control operations may include any operations associated with causing the UAV to fly from an origin to a destination. For example, the flight control operations may include operations to cause the UAV to fly along a designated route (e.g., based on route information (110), as further described herein), to perform operations based on control data received from one or more control devices, to take off, land, hover, change altitude, change pitch/yaw/roll angles, or any other flight-related operations. The UAV (102) may include one or more actuators, such as one or more flight control actuators, one or more thrust actuators, etc., and execution of the operation instructions (108) may cause the processor (104) to control the one or more actuators to perform the flight control operations. The one or more actuators may include one or more electrical actuators, one or more magnetic actuators, one or more hydraulic actuators, one or more pneumatic actuators, one or more other actuators, or a combination thereof.

The route information (110) may indicate a flight path for the UAV (102) to follow. For example, the route information (110) may specify a starting point (e.g., an origin) and an ending point (e.g., a destination) for the UAV (102). Additionally, the route information may also indicate a plurality of waypoints, zones, areas, regions between the starting point and the ending point.

The route information (110) may also indicate a corresponding set of control devices for various points, zones, regions, areas of the flight path. The indicated sets of control devices may be associated with a pilot (and optionally one or more backup pilots) assigned to have control over the UAV (102) while the UAV (102) is in each zone. The route information (110) may also indicate time periods during which the UAV is scheduled to be in each of the zones (and thus time periods assigned to each pilot or set of pilots).

In the example of FIG. 1, the memory (106) of the UAV (102) also includes communication instructions (111) that when executed by the processor (104) cause the processor (104) to transmit to the distributed computing network (151), transaction messages that include telemetry data (107). Telemetry data may include any information that could be useful to identifying the location of the UAV, the operating parameters of the UAV, or the status of the UAV. Examples of telemetry data include but are not limited to GPS coordinates, instrument readings (e.g., airspeed, altitude, altimeter, turn, heading, vertical speed, attitude, turn and slip), and operational readings (e.g., pressure gauge, fuel gauge, battery level).

The control device (120) includes a processor (122) coupled to a memory (124), a display device (132), and communication circuitry (134). The display device (132) may be a liquid crystal display (LCD) screen, a touch screen, another type of display device, or a combination thereof. The communication circuitry (134) includes a transmitter and a receiver or a combination thereof (e.g., a transceiver). In a particular implementation, the communication circuitry (134) (or the processor (122)) is configured to encrypt outgoing message(s) using a private key associated with the control device (120) and to decrypt incoming message(s) using a public key of a device (e.g., the UAV (102) or the server (140)) that sent the incoming message(s). Thus, in this implementation, communication between the UAV (102), the control device (120), and the server (140) are secure and trustworthy (e.g., authenticated).

The processor (122) is configured to execute instructions from the memory (124) to perform various operations. The instructions also include control instructions (130) that include instructions or code that cause the control device (120) to generate control data to transmit to the UAV (102) to enable the control device (120) to control one or more operations of the UAV (102) during a particular time period, as further described herein. The instructions also include deconfliction instructions (139) that include receiving flight path data for a first unmanned aerial vehicle (UAV), wherein the flight path data indicates a first flight path that traverses a geographic cell assigned to the deconfliction controller; determining, by a deconfliction module, whether the first flight path conflicts with at least one second flight path of at least one second UAV, wherein the at least one second flight path also traverses the geographic cell; and providing, in dependence upon the determination, first navigation instructions for one or more UAVs. The deconfliction instructions (139) are further configured for determining that the first flight path conflicts with the at least one of second flight path and providing, to at least one of the first UAV and the second UAV, rerouting instructions for a rerouted flight path that avoids the conflict. In some embodiments the first UAV and the at least one second UAV are coordinated by a server and the method further comprises transmitting one or more rerouted flight paths to a server. The deconfliction instructions (139) are further configured for receiving a flight path approval request and providing a flight path approval response to the first UAV.

In the example of FIG. 1, the memory (124) of the control device (102) also includes communication instructions (131) that when executed by the processor (122) cause the processor (122) to transmit to the distributed computing network (151), transaction messages that include control instructions (130) or deconfliction instructions (139) that are directed to the UAV (102). In a particular embodiment, the transaction messages are also transmitted to the UAV and the UAV takes action (e.g., adjusting flight operations), based on the information (e.g., control data) in the message.

The server (140) includes a processor (142) coupled to a memory (146), and communication circuitry (144). The communication circuitry (144) includes a transmitter and a receiver or a combination thereof (e.g., a transceiver). In a particular implementation, the communication circuitry (144) (or the processor (142)) is configured to encrypt outgoing message(s) using a private key associated with the server (140) and to decrypt incoming message(s) using a public key of a device (e.g., the UAV (102) or the control device (120)) that sent the incoming message(s). As will be explained further below, the outgoing and incoming messages may be transaction messages that include information associated with the UAV. Thus, in this implementation, communication between the UAV (102), the control device (120), and the server (140) are secure and trustworthy (e.g., authenticated).

The processor (142) is configured to execute instructions from the memory (146) to perform various operations. The instructions include route instructions (148) comprising computer program instructions for aggregating data from disparate data servers, virtualizing the data in a map, generating a cost model for paths traversed in the map, and autonomously selecting the optimal route for the UAV based on the cost model. For example, the route instructions (148) are configure to partition a map of a region into geographic cells, calculate a cost for each geographic cell, wherein the cost is a sum of a plurality of weighted factors, determine a plurality of flight paths for the UAV from a first location on the map to a second location on the map, wherein each flight path traverses a set of geographic cells, determine a cost for each flight path based on the total cost of the set of geographic cells traversed, and select, in dependence upon the total cost of each flight path, an optimal flight path from the plurality of flight paths. The route instructions (148) are further configured to obtain data from one or more data servers regarding one or more geographic cells, calculate, in dependence upon the received data, an updated cost for each geographic cell traversed by a current flight path, calculate a cost for each geographic cell traversed by at least one alternative flight path from the first location to the second location, determine that at least one alternative flight path has a total cost that is less than the total cost of the current flight path, and select a new optimal flight path from the at least one alternative flight paths. The route instructions (148) may also include instructions for storing the parameters of the selected optimal flight path as route information (110). For example, the route information may include waypoints marked by GPS coordinates, arrival times for waypoints, pilot assignments. The route instructions (148) may also include instructions receiving, by a server in a UAV transportation ecosystem, search area data; accessing, by the server, UAV parameters for a type of UAV; determining, by the server in dependence upon the search area data and the UAV parameters, a number of UAVs needed to complete a coordinated aerial search of a search area within a time limit; and partitioning, by the server, the search area into a plurality of partitions, wherein the number of partitions is equal to the number of UAVs. The server (140) may be configured to transmit the route information (110), including search route information, to the UAV (102).

The instructions may also include control instructions (150) that include instructions or code that cause the server (140) to generate control data to transmit to the UAV (102) to enable the server (140) to control one or more operations of the UAV (102) during a particular time period, as further described herein.

In the example of FIG. 1, the memory (146) of the server (140) also includes communication instructions (147) that when executed by the processor (142) cause the processor (142) to transmit to the distributed computing network (151), transaction messages that include control instructions (150) or route instructions (139) that are directed to the UAV (102).

The distributed computing network (151) of FIG. 1 includes a plurality of computers (157). An example computer (158) of the plurality of computers (157) is shown and includes a processor (152) coupled to a memory (154), and communication circuitry (153). The communication circuitry (153) includes a transmitter and a receiver or a combination thereof (e.g., a transceiver). In a particular implementation, the communication circuitry (153) (or the processor (152)) is configured to encrypt outgoing message(s) using a private key associated with the computer (158) and to decrypt incoming message(s) using a public key of a device (e.g., the UAV (102), the control device (120), or the server (140)) that sent the incoming message(s). As will be explained further below, the outgoing and incoming messages may be transaction messages that include information associated with the UAV. Thus, in this implementation, communication between the UAV (102), the control device (120), the server (140), and the distributed computing network (151) are secure and trustworthy (e.g., authenticated).

The processor (145) is configured to execute instructions from the memory (154) to perform various operations. The memory (154) includes a blockchain manager (155) that includes computer program instructions for coordinating an aerial search among unmanned aerial vehicles. Specifically, the blockchain manager (155) includes computer program instructions that when executed by the processor (152) cause the processor (152) to receive a transaction message associated with a UAV. For example, the blockchain manager may receive transaction messages from the UAV (102), the control device (120), or the server (140). The blockchain manager (155) also includes computer program instructions that when executed by the processor (152) cause the processor (152) to use the information within the transaction message to create a block of data; and store the created block of data in a blockchain data structure (156) associated with the UAV.

The blockchain manager may also include instructions for accessing information regarding an unmanned aerial vehicle (UAV). For example, the blockchain manager (155) also includes computer program instructions that when executed by the processor (152) cause the processor to receive from a device, a request for information regarding the UAV; in response to receiving the request, retrieve from a blockchain data structure associated with the UAV, data associated with the information requested; and based on the retrieved data, respond to the device.

The UAV (102), the control device (120), and server (140) are communicatively coupled via a network (118). For example, the network (118) may include a satellite network or another type of network that enables wireless communication between the UAV (102), the control device (120), the server (140), and the distributed computing network (151). In an alternative implementation, the control device (120), the server (140) communicate with the UAV (102) via separate networks (e.g., separate short range networks.

In some situations, minimal (or no) manual control of the UAV (102) may be performed, and the UAV (102) may travel from the origin to the destination without incident. However, in some situations, one or more pilots may control the UAV (102) during a time period, such as to perform object avoidance or to compensate for an improper UAV operation. In some situations, the UAV (102) may be temporarily stopped, such as during an emergency condition, for recharging, for refueling, to avoid adverse weather conditions, responsive to one or more status indicators from the UAV (102), etc. In some implementations, due to the unscheduled stop, the route information (110) may be updated (e.g., via a subsequent blockchain entry, as further described herein) by route instructions (148) executing on the UAV (102), the control device (120), or the server (140)). The updated route information may include updated waypoints, updated time periods, and updated pilot assignments.

In a particular implementation, the route information is exchanged using a blockchain data structure. The blockchain data structure may be shared in a distributed manner across a plurality of devices of the system (100), such as the UAV (102), the control device (120), the server (140), and any other control devices or UAVs in the system (100). In a particular implementation, each of the devices of the system (100) stores an instance of the blockchain data structure in a local memory of the respective device. In other implementations, each of the devices of the system (100) stores a portion of the shared blockchain data structure and each portion is replicated across multiple of the devices of the system (100) in a manner that maintains security of the shared blockchain data structure as a public (i.e., available to other devices) and incorruptible (or tamper evident) ledger. Alternatively, as in FIG. 1, the blockchain (156) is stored in a distributed manner in the distributed computing network (151).

Figure 3A:
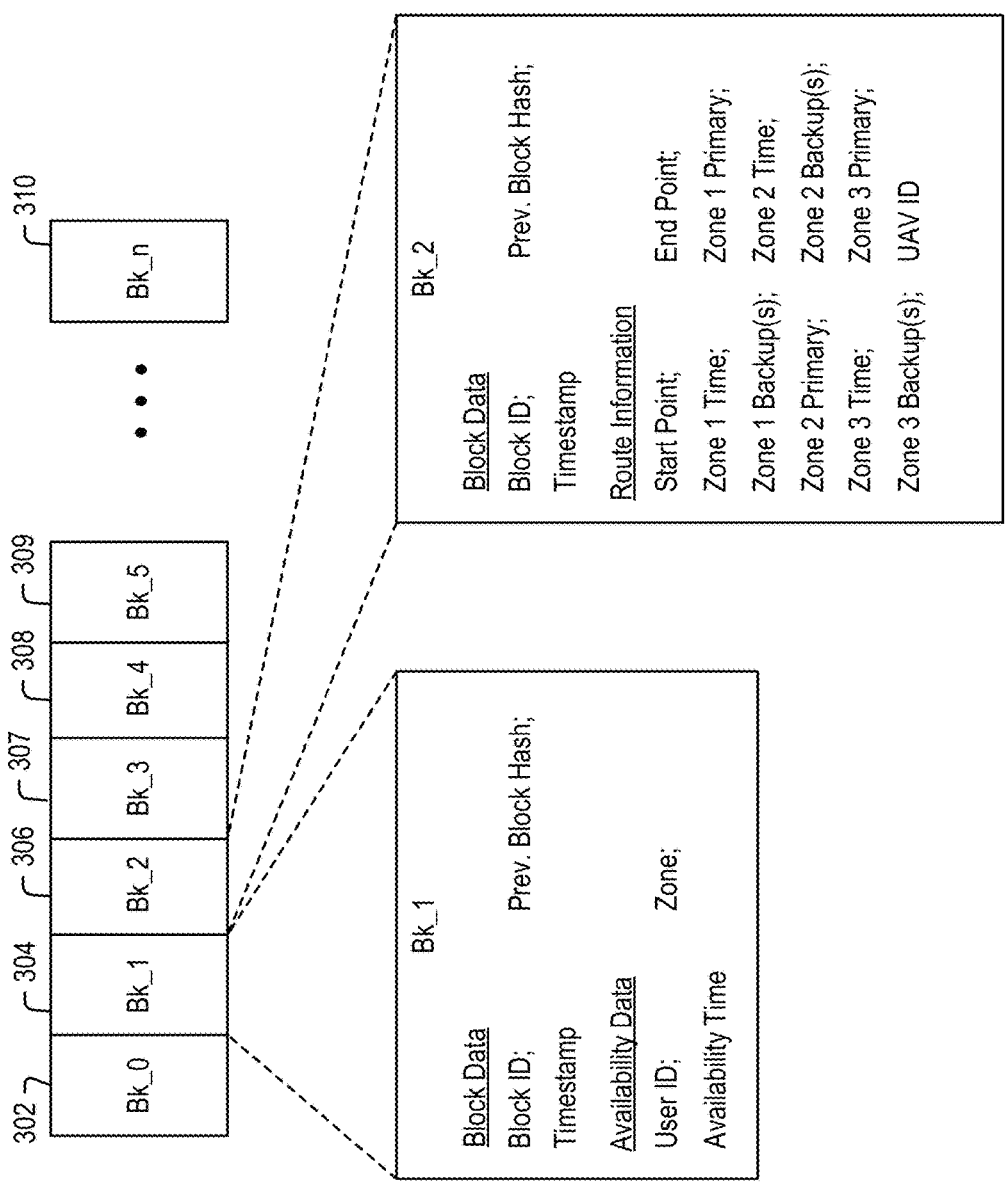
FIG. 3A a block diagram illustrating a particular implementation of the blockchain used by the systems of FIGS. 1-2 to record data associated with an unmanned aerial vehicle.
Figure 3B:
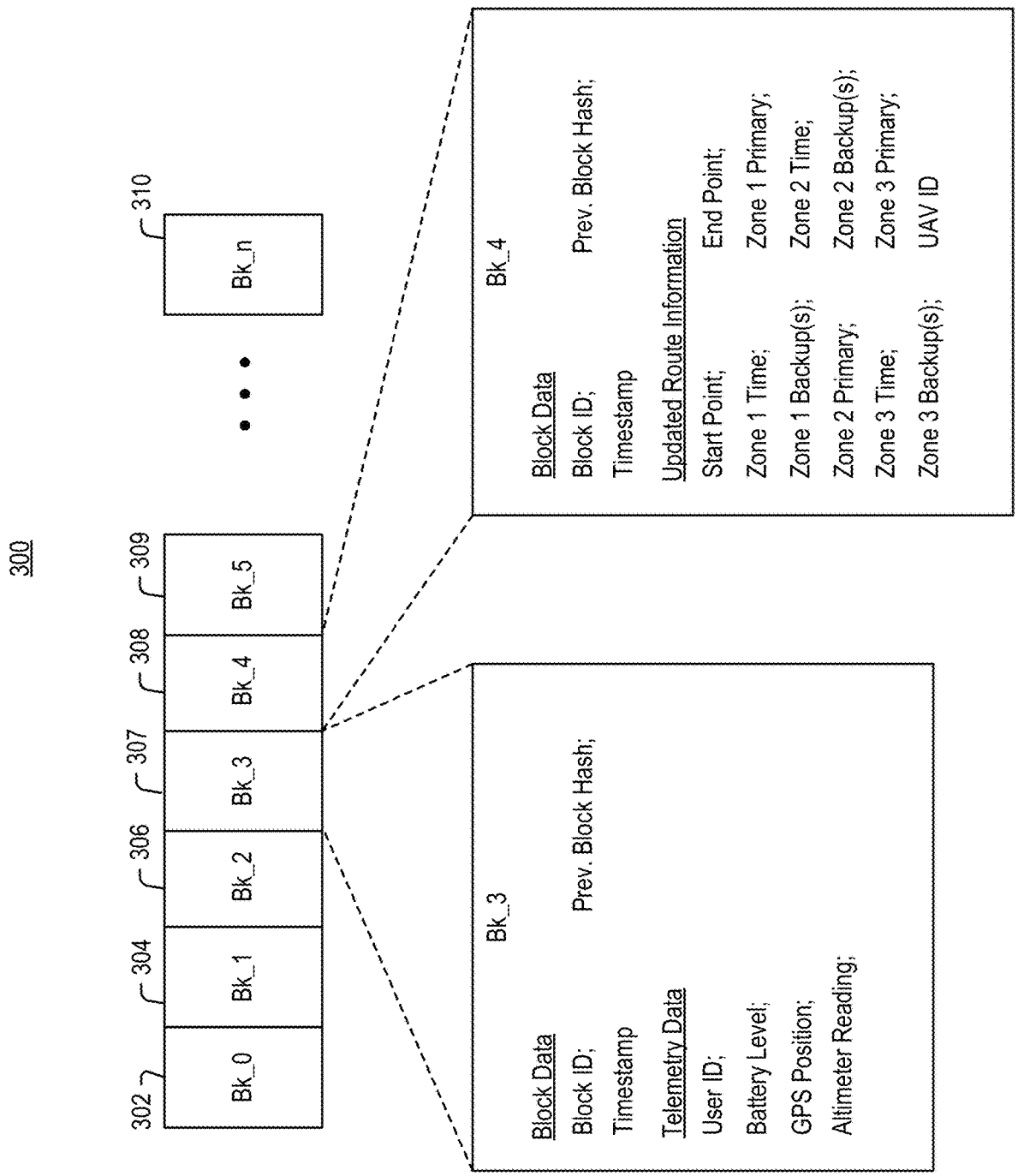
FIG. 3B is an additional view of the blockchain of FIG. 3A.
Figure 3C:
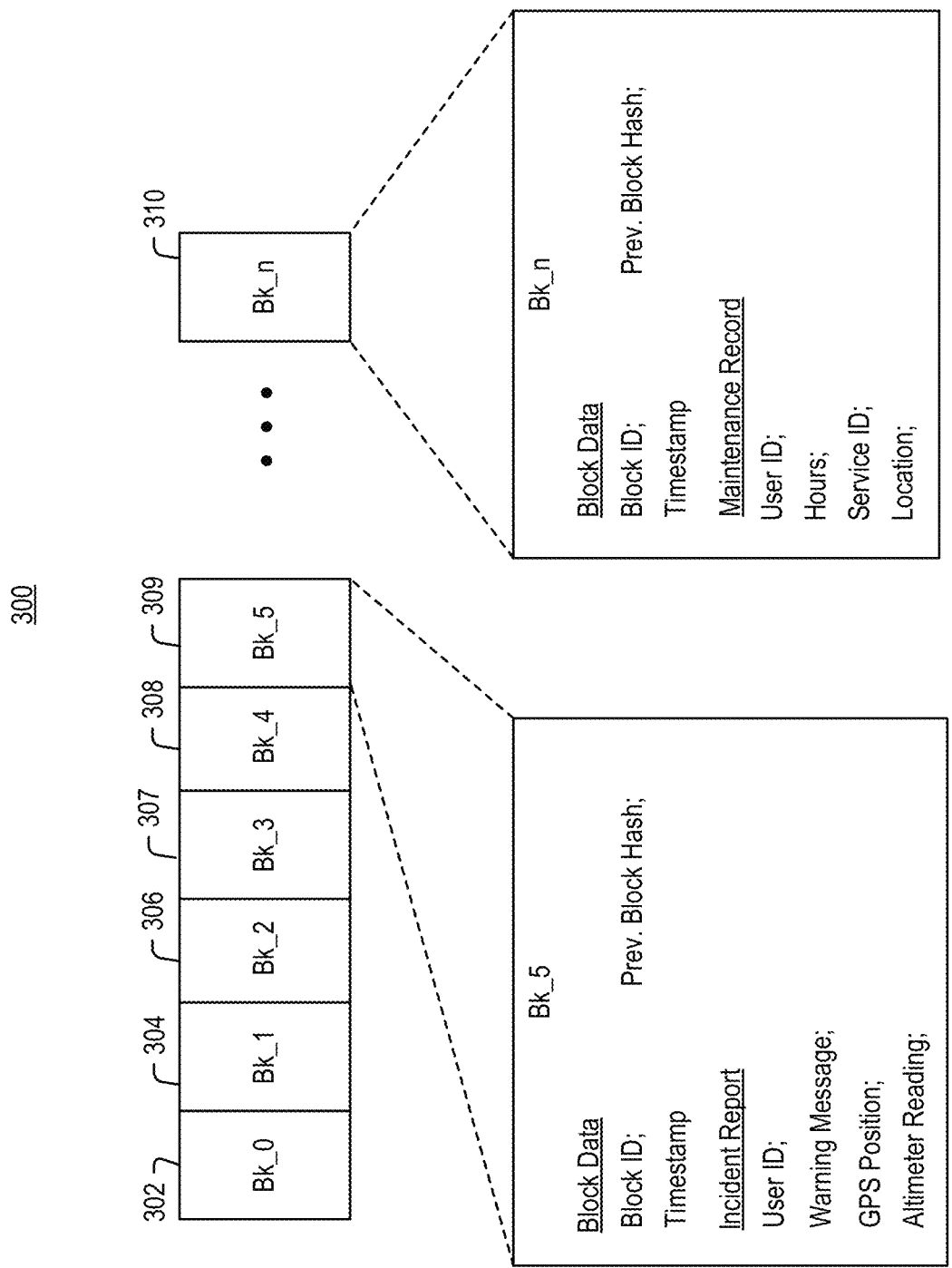
FIG. 3C is an additional view of the blockchain of FIG. 3A.

The blockchain data structure (156) may include, among other things, route information associated with the UAV (102), the telemetry data (107), the control instructions (131), the deconfliction instructions (139), and the route instructions (148). For example, the route information (110) may be used to generate blocks of the blockchain data structure (156). A sample blockchain data structure (300) is illustrated in FIGS. 3A-3C. Each block of the blockchain data structure (300) includes block data and other data, such as availability data, route data, telemetry data, service information, incident reports, etc.

The block data of each block includes information that identifies the block (e.g., a block ID) and enables the devices of the system (100) to confirm the integrity of the blockchain data structure (300). For example, the block data also includes a timestamp and a previous block hash. The timestamp indicates a time that the block was created. The block ID may include or correspond to a result of a hash function (e.g., a SHA256 hash function, a RIPEMD hash function, etc.) based on the other information (e.g., the availability data or the route data) in the block and the previous block hash (e.g., the block ID of the previous block). For example, in FIG. 3A, the blockchain data structure (300) includes an initial block (Bk_0) (302) and several subsequent blocks, including a block Bk_1 (304), a block Bk_2 (306), a block BK_3 (307), a block BK_4 (308), a block BK_5 (309), and a block Bk_n (310). The initial block Bk_0 (302) includes an initial set of availability data or route data, a timestamp, and a hash value (e.g., a block ID) based on the initial set of availability data or route data. As shown in FIG. 1, the block Bk_1 (304) also may include a hash value based on the other data of the block Bk_1 (304) and the previous hash value from the initial block Bk_0 (302). Similarly, the block Bk_2 (306) other data and a hash value based on the other data of the block Bk_2 (306) and the previous hash value from the block Bk_1 (304). The block Bk_n (310) includes other data and a hash value based on the other data of the block Bk_n (310) and the hash value from the immediately prior block (e.g., a block Bk_n–1). This chained arrangement of hash values enables each block to be validated with respect to the entire blockchain; thus, tampering with or modifying values in any block of the blockchain is evident by calculating and verifying the hash value of the final block in the block chain. Accordingly, the blockchain acts as a tamper-evident public ledger of availability data and route data for the system (100).

In addition to the block data, each block of the blockchain data structure (300) includes some information associated with a UAV (e.g., availability data, route information, telemetry data, incident reports, updated route information, maintenance records, etc.). For example, the block Bk_1 (304) includes availability data that includes a user ID (e.g., an identifier of the mobile device, or the pilot, that generated the availability data), a zone (e.g., a zone at which the pilot will be available), and an availability time (e.g., a time period the pilot is available at the zone to pilot a UAV). As another example, the block Bk_2 (306) includes route information that includes a UAV ID, a start point, an end point, waypoints, GPS coordinates, zone markings, time periods, primary pilot assignments, and backup pilot assignments for each zone associated with the route.

In the example of FIG. 3B, the block BK_3 (307) includes telemetry data, such as a user ID (e.g., an identifier of the UAV that generated the telemetry data), a battery level of the UAV; a GPS position of the UAV; and an altimeter reading. As explained in FIG. 1, a UAV may include many types of information within the telemetry data that is transmitted to the blockchain managers of the computers within the distributed computing network (151). In a particular embodiment, the UAV is configured to periodically broadcast to the network (118), a transaction message that includes the UAV's current telemetry data. The blockchain managers of the distributed computing network receive the transaction message containing the telemetry data and store the telemetry data within the blockchain (156).

FIG. 3B also depicts the block BK_4 (308) as including updated route information having a start point, an endpoint, and a plurality of zone times and backups, along with a UAV ID. In a particular embodiment, the control device (120) or the server (140) may determine that the route of the UAV should be changed. For example, the control device or the server may detect that the route of the UAV conflicts with a route of another UAV or a developing weather pattern. As another example, the control device or the server many determine that the priority level or concerns of the user have changed and thus the route needs to be changed. In such instances, the control device or the server may transmit to the UAV, updated route information, control data, or navigation information. Transmitting the updated route information, control data, or navigation information to the UAV may include broadcasting a transaction message that includes the updated route information, control data, or navigation information to the network (118). The blockchain manager (155) in the distributed computing network (151), retrieves the transaction message from the network (118) and stores the information within the transaction message in the blockchain (156).

FIG. 3C depicts the block BK_5 (309) as including data describing an incident report. In the example of FIG. 3C, the incident report includes a user ID; a warning message; a GPS position; and an altimeter reading. In a particular embodiment, a UAV may transmit a transaction message that includes an incident report in response to the UAV experiencing an incident. For example, if during a flight mission, one of the UAV's propellers failed, a warning message describing the problem may be generated and transmitted as a transaction message.

FIG. 3C also depicts the block BK_n (310) that includes a maintenance record having a user ID of the service provider that serviced the UAV; flight hours that the UAV had flown when the service was performed; the service ID that indicates the type of service that was performed; and the location that the service was performed. UAV must be serviced periodically. When the UAV is serviced, the service provider may broadcast to the blockchain managers in the distributed computing network, a transaction message that includes service information, such as a maintenance record. Blockchain managers may receive the messages that include the maintenance record and store the information in the blockchain data structure. By storing the maintenance record in the blockchain data structure, a digital and immutable record or logbook of the UAV may be created. This type of record or logbook may be particularly useful to a regulatory agency and an owner/operator of the UAV.

Referring back to FIG. 1, in a particular embodiment, the server (140) includes software that is configured to receive telemetry information from an airborne UAV and track the UAV's progress and status. The server (140) is also configured to transmit in-flight commands to the UAV. Operation of the control device and the server may be carried out by some combination of a human operator and autonomous software (e.g., artificial intelligence (AI) software that is able to perform some or all of the operational functions of a typical human operator pilot).

In a particular embodiment, the route instructions (148) cause the server (140) to plan a flight path, generate route information, dynamically reroute the flight path and update the route information based on data aggregated from a plurality of data servers. For example, the server (140) may receive air traffic data (167) over the network (119) from the air traffic data server (160), weather data (177) from the weather data server (170), regulatory data (187) from the regulatory data server (180), and topographical data (197) from the topographic data server (190). It will be recognized by those of skill in the art that other data servers useful in-flight path planning of a UAV may also provide data to the server (140) over the network (101) or through direct communication with the server (140).

The air traffic data server (160) may include a processor (162), memory (164), and communication circuitry (168). The memory (164) of the air traffic data server (160) may include operating instructions (166) that when executed by the processor (162) cause the processor to provide the air traffic data (167) about the flight paths of other aircraft in a region, including those of other UAVs. The air traffic data may also include real-time radar data indicating the positions of other aircraft, including other UAVs, in the immediate vicinity or in the flight path of a particular UAV. Air traffic data servers may be, for example, radar stations, airport air traffic control systems, the FAA, UAV control systems, and so on.

The weather data server (170) may include a processor (172), memory (174), and communication circuitry (178). The memory (174) of the weather data server (170) may include operating instructions (176) that when executed by the processor (172) cause the processor to provide the weather data (177) that indicates information about atmospheric conditions along the UAV's flight path, such as temperature, wind, precipitation, lightening, humidity, atmospheric pressure, and so on. Weather data servers may be, for example, the National Weather Service (NWS), the National Oceanic and Atmospheric Administration (NOAA), local meteorologists, radar stations, other aircraft, and so on.

The regulatory data server (180) may include a processor (182), memory (184), and communication circuitry (188). The memory (184) of the weather data server (180) may include operating instructions (186) that when executed by the processor (182) cause the processor to provide the regulatory data (187) that indicates information about laws and regulations governing a particular region of airspace, such as airspace restrictions, municipal and state laws and regulations, permanent and temporary no-fly zones, and so on. Regulatory data servers may include, for example, the FAA, state and local governments, the Department of Defense, and so on.

The topographical data server (190) may include a processor (192), memory (194), and communication circuitry (198). The memory (194) of the topographical data server (190) may include operating instructions (196) that when executed by the processor (192) cause the processor to provide the topographical data that indicates information about terrain, places, structures, transportation, boundaries, hydrography, orthoimagery, land cover, elevation, and so on. Topographic data may be embodied in, for example, digital elevation model data, digital line graphs, and digital raster graphics. Topographic data servers may include, for example, the United States Geological Survey or other geographic information systems (GIS s).

In some embodiments, the server (140) may aggregate data from the data servers (160, 170, 180, 190) using application program interfaces (APIs), syndicated feeds and eXtensible Markup Language (XML), natural language processing, JavaScript Object Notation (JSON) servers, or combinations thereof. Updated data may be pushed to the server (140) or may be pulled on-demand by the server (140). Notably, the FAA may be an important data server for both airspace data concerning flight paths and congestion as well as an important data server for regulatory data such as permanent and temporary airspace restrictions. For example, the FAA provides the Aeronautical Data Delivery Service (ADDS), the Aeronautical Product Release API (APRA), System Wide Information Management (SWIM), Special Use Airspace information, and Temporary Flight Restrictions (TFR) information, among other data. The National Weather Service (NWS) API allows access to forecasts, alerts, and observations, along with other weather data. The USGS Seamless Server provides geospatial data layers regarding places, structures, transportation, boundaries, hydrography, orthoimagery, land cover, and elevation. Readers of skill in the art will appreciate that various governmental and non-governmental entities may act as data servers and provide access to that data using APIs, JSON, XML, and other data formats.

Readers of skill in the art will realize that the server (140) can communicate with a UAV (102) using a variety of methods. For example, the UAV (102) may transmit and receive data using Cellular, 5G, SublGHz, SigFox, WiFi networks, or any other communication means that would occur to one of skill in the art.

The network (119) may comprise one or more Local Area Networks (LANs), Wide Area Networks (WANs), cellular networks, satellite networks, internets, intranets, or other networks and combinations thereof. The network (119) may comprise one or more wired connections, wireless connections, or combinations thereof.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), and others as will occur to those of skill in the art. Various embodiments of the present invention may be implemented on a variety of hardware platforms in addition to those illustrated in FIG. 1.

Figure 2:
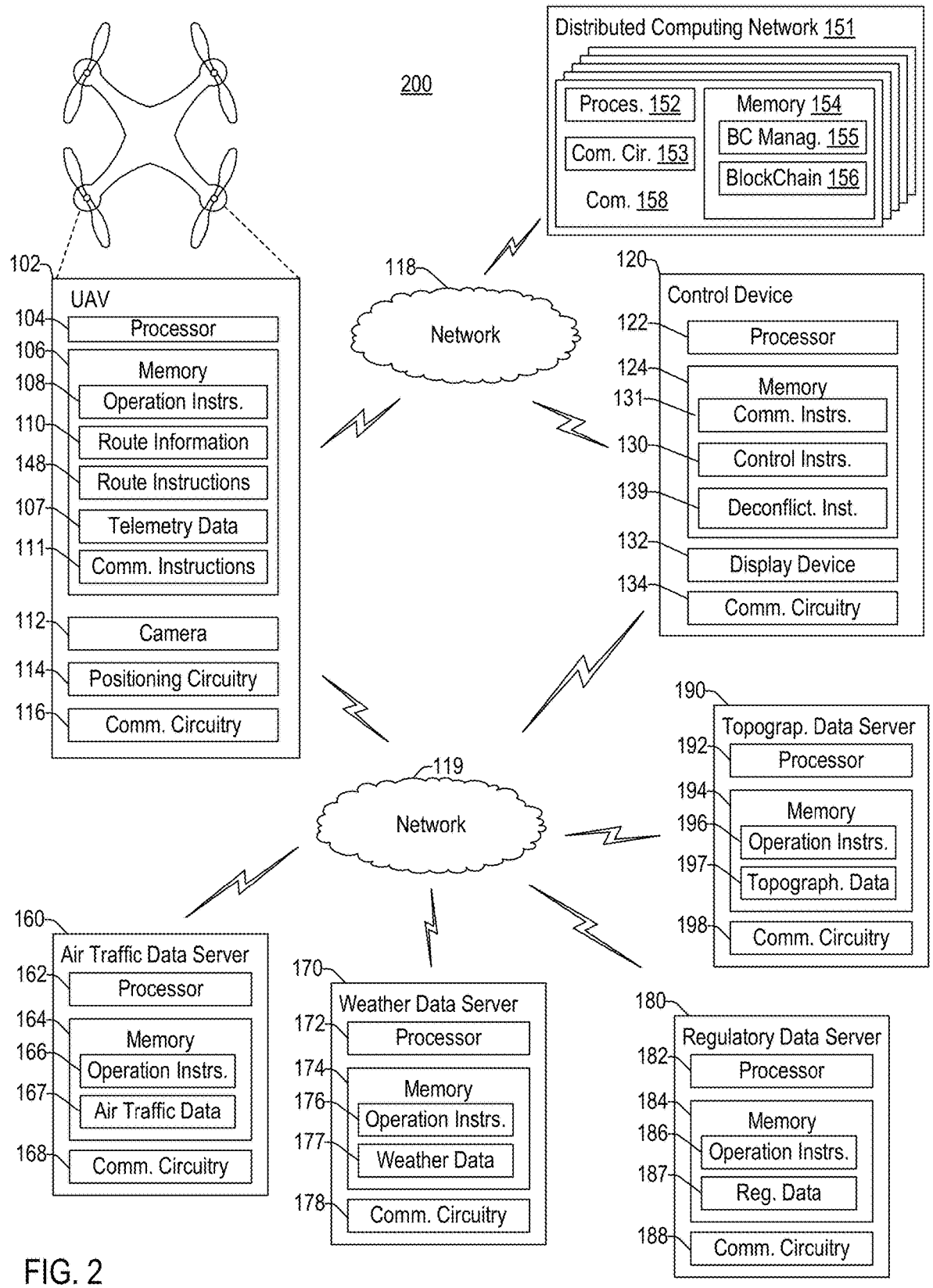
FIG. 2 is a block diagram illustrating another implementation of a system for coordinating an aerial search among unmanned aerial vehicles.

For further explanation, FIG. 2 sets forth a block diagram illustrating another implementation of a system (200) for coordinating an aerial search among unmanned aerial vehicles. Specifically, the system (200) of FIG. 2 shows an alternative configuration in which one or both of the UAV (102) and the server (140) may include route instructions (148) for generating route information. In this example, instead of relying on a server (140) to generate the route information, the UAV (102) and the control device (120) may retrieve and aggregate the information from the various data sources (e.g., the air traffic data server (160), the weather data server (170), the regulatory data server (180), and the topographical data server (190)). As explained in FIG. 1, the route instructions may be configured to use the aggregated information from the various source to plan and select a flight path for the UAV (102).

Figure 4:
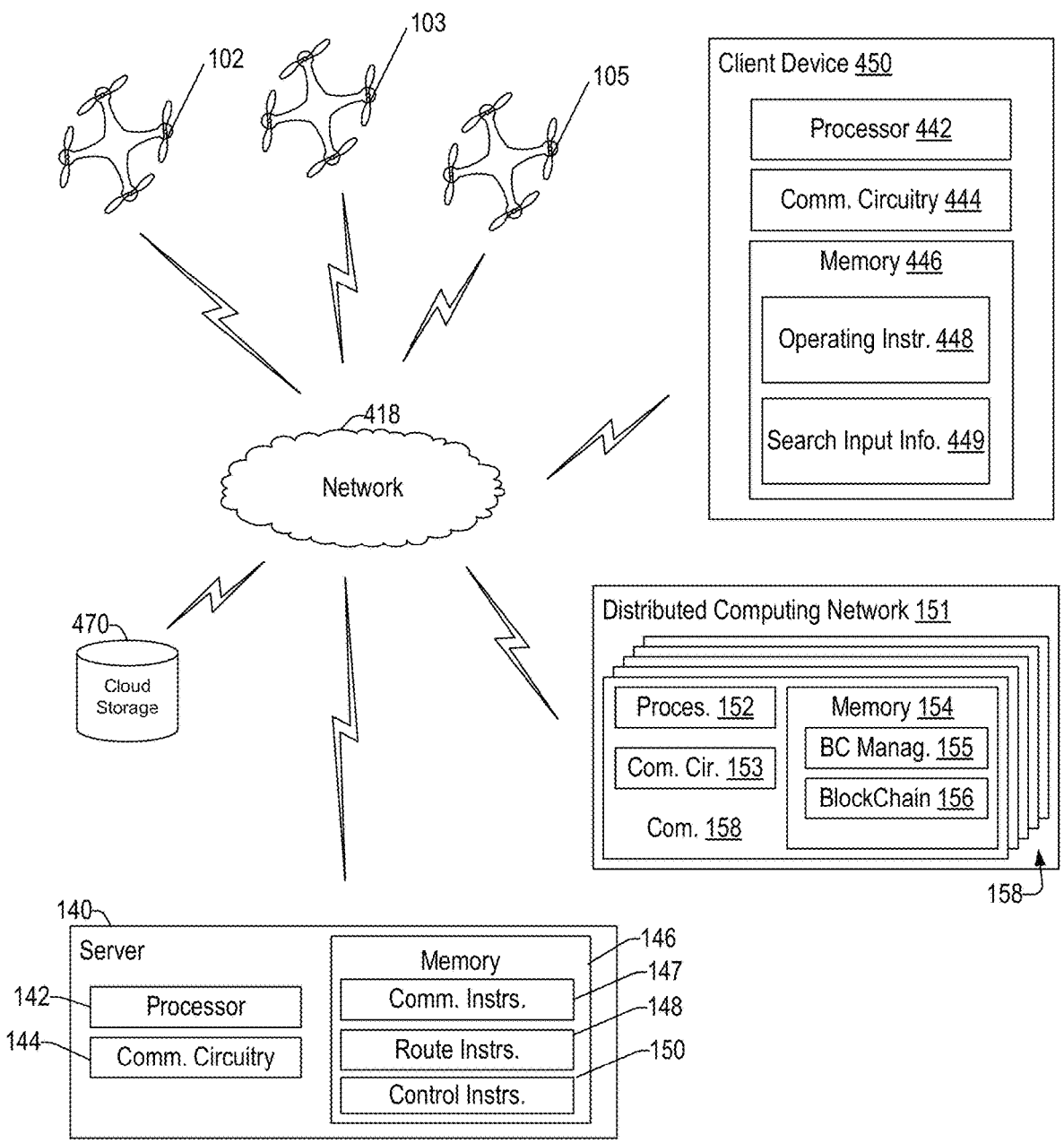
FIG. 4 is a block diagram illustrating a particular implementation of a system for coordinating an aerial search among unmanned aerial vehicles.

FIG. 4 is a block diagram illustrating a particular implementation of a system (400) for coordinating an aerial search among unmanned aerial vehicles. The system (400) includes the first UAV (102) of FIGS. 1-2, a second UAV (103), a third UAV (105), the server (140) of FIGS. 1-2, the distributed computing network (151) of FIGS. 1-2, a cloud storage device (470), and a client device (450) coupled for communication to a network (418).

The client device (450) includes a processor (442) coupled to communication circuitry (444) and a memory (446). The memory (446) includes operating instructions (448) which are configured to formulate search input information (449) and transmit via the communication circuitry (444), search data that includes the search input information (449) to the server (140). For example, the client device (450) may utilize an Application Program Interface (API) exposed by the server (140) to provide the search data to server (140) or may send a request message (e.g., in the form of a transaction message) including the search data to the server (140). A client device may be a device that is used by a network client for initiating a search plan request. Examples of network clients include but are not limited to rescue organizations, fire departments, law enforcement organizations, and other types of organizations that may require aerial search data. For example, a local fire and rescue department may employ the network to generate a UAV search plan to coordinate an aerial search by multiple UAVs to find a missing boater on a lake, or the National Park Service may employ the network to generate a UAV search plan to coordinate an aerial search by multiple UAVs to find a missing hiker. The client device may encapsulate a geographical search area along with additional information, such as the type of UAV and/or a search time limit, within the search input information (449). In one example, the client device may broadcast a transaction message that includes the search data to the server (140) and to the distributed computing network. In this example, the blockchain managers of the distributed computing network may create a block that includes the search data and store the block in the blockchain (156).

The operating instructions (448) are configured to formulate search input information (449) from a human input. The operating instructions (448) may generate search input information (449) by providing a graphical user interface (GUI) for display on the client device (450) that allows a user to draw a search perimeter on a map (e.g., using a mouse or a touchscreen). For example, the client device may be a smart device with a touchscreen that allows the user to draw a search perimeter on a map that is used to generate the search input information (449). The operating instructions (448) may also generate search input information (449) by providing an interface for entering GPS coordinates that define a search area. For example, a user may enter a set of GPS coordinates (e.g., map points) that form a polygon that defines the search area. The operating instructions (448) may also generate search input information (449) by using an API (e.g., exposed by the server (140) for inputting search data and parameters. For example, a user may enter the name of a lake or national forest, the boundary of which is used to generate the search input information (449). Other mechanisms for inputting search data on the client device will be appreciated by those of skill in the art. The operating instructions (448) are further configured to communicate, via the communication circuitry (444), the search data to the server (140). In an embodiment, the client device (450) may be a controller, such as the controller (120) of FIGS. 1-2, that requests a search plan and route information to be returned to the controller for transmission to one or more UAVs (102, 103, 105). In this example, the client device (450) also includes the control instructions (130) for sending control commands to the UAVs to execute search routes obtained from the server (140). In other embodiments, search plan request includes a request that the search route be executed via one or more UAVs (102, 103, 105) under the control of the server (140), wherein route information is transmitted by the server to the UAVs for performing a coordinated aerial search.

In a particular embodiment, the network (418) may include a cellular network, a satellite network or another type of network that enables wireless communication between the UAVs (102, 103, 105), the server (140), the client device (450), and the distributed computing network (151). In an alternative implementation, the UAVs (102, 103, 105), the client device (450), the server (140) and the distributed computing network (151) communicated with each other via separate networks (e.g., separate short range networks).

Figure 5:
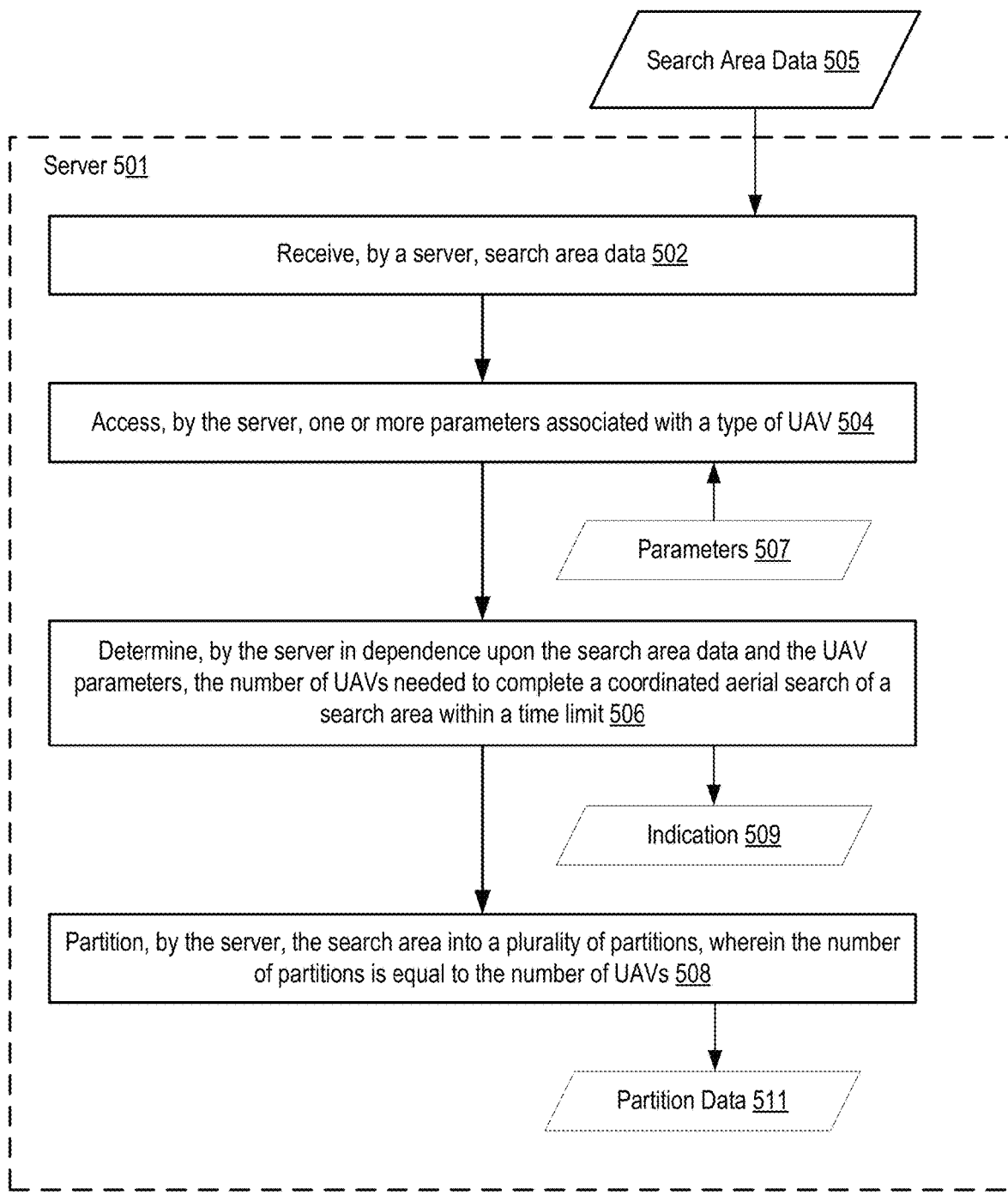
FIG. 5 is a flowchart to illustrate an implementation of a method for coordinating an aerial search among unmanned aerial vehicles.

For further explanation, FIG. 5 sets forth a flow chart illustrating an exemplary method for coordinating an aerial search among unmanned aerial vehicles in accordance with embodiments of the invention. The method of FIG. 5 includes a server (501) of a UAV transportation ecosystem receiving (502) search area data (505). The server (501) may be, for example, the server (140) of FIGS. 1 and 4. The search area data (505) may include data such as a set of GPS coordinates that define vertices of a search area, geographical map data that includes a search area perimeter overlaid on a map region, a place name of a geographical area having a defined boundary (e.g., a lake, a national park, a city), or other data specifying a geographical search area as will occur to those of skill in the art. Receiving (502), by the server (501), the search area data (505) may be carried out by the server (501) providing an API for receiving, from another device (e.g., the control device (120) of FIGS. 1-2 or the client device (450) of FIG. 4) and by the other device providing the search area data (505) using the API. Receiving (502), by the server (501), the search area data (505) may also be carried out by a device providing a graphical user interface (GUI) to a user that inputs the search area data (505) via the GUI, and by the server (501) receiving the search area data (505). In one example, the user of a device (e.g., client device (450) of FIG. 4) draws a search perimeter on a map region using a touchscreen interface of the device, and the device provides the map region and search perimeter as search area data (505) to the server (501). Receiving (502), by the server (501), the search area data (505) may also be carried out by the server (501) receiving a message that includes the search area data (505).

In a particular embodiment, the server (501) receives search area data that includes a set of GPS coordinates representing a search perimeter. For example, a user of the client device may identify points on a map region displayed on a touchscreen or other GUI. The map points are translated to a set GPS coordinates, which form vertices of a polygon representing a search area perimeter. In another example, the user of the device may draw an irregular shape on the touchscreen or other GUI, and the contour of the shape is sampled to identify GPS coordinates from the map region, which form a polygon approximating the search area perimeter drawn by the user. Either the server (501) or another device in the UAV transportation ecosystem (e.g., client device (450) may generate a polygon that identifies or represents the search area perimeter.

Figure 6A:
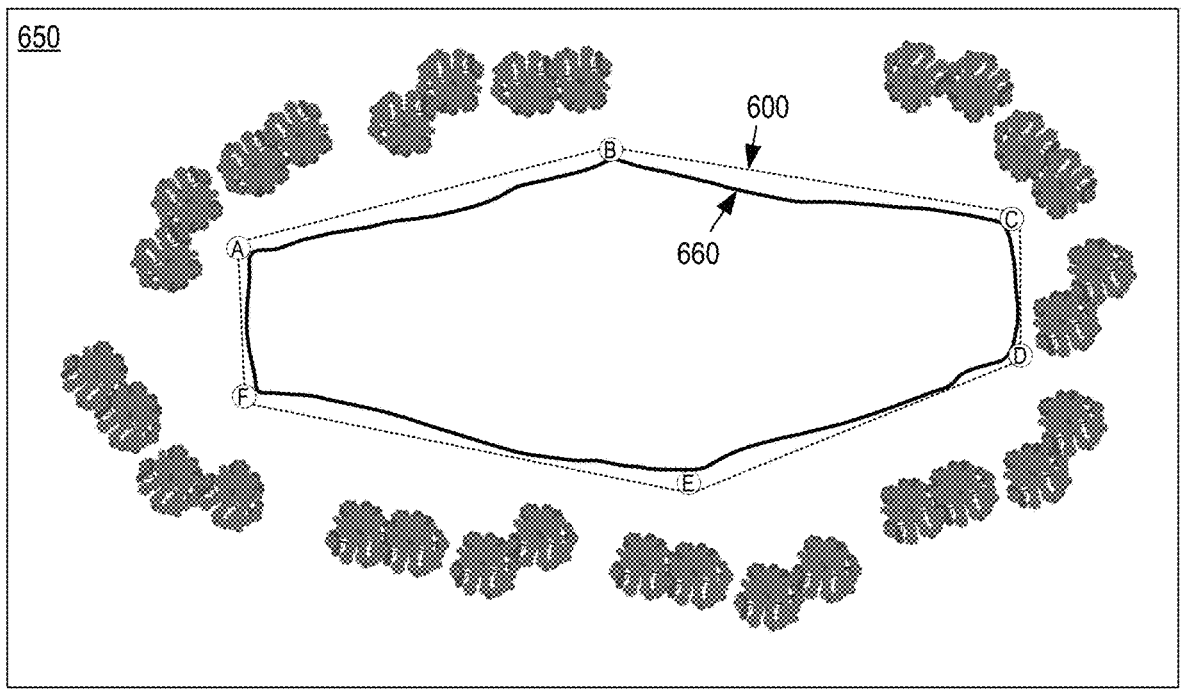
FIG. 6A is an exemplary search area for coordinating an aerial search among unmanned aerial vehicles.

For further illustration, FIG. 6A sets forth a non-limiting example of a map region (650) and a polygon (600) representing a search area perimeter (660). When a user draws the search area perimeter (650), vertices (A, B, C, D, E, F) are identified from the search area perimeter (660) and connected by edges to form the polygon (600).

The method of FIG. 5 also includes accessing (504), by the server (501), one or more parameters (507) associated with a type of UAV. Accessing (504), by the server (501), one or more parameters (507) associated with a type of UAV may be carried out by the server (501) acquiring data indicating the one or more parameters (507) associated with the type of UAV. A type of UAV may be indicated by, for example, a UAV manufacturer model number, a serial number, a class, a platform (e.g., multirotor, single rotor, fixed wing, hybrid, etc.), range (e.g., short range, long range, etc.), etc. Parameters associated with a type of UAV may specify capabilities and limitations of the type of UAV. Examples of parameters associated with a type of UAV may include but are not limited to a maximum range on a full charge, a maximum runtime on a full charge, maximum speed, minimum speed, etc. Parameters associated with a type of UAV may also include power consumption relationships between speed and range or runtime. For example, a maximum runtime may be related to the power consumption at a particular speed, such that expected runtime decreases as the travel speed increases. Readers of skill in the art that a variety of parameters may be associated with a particular type of UAV. As explained above, this data may be stored in various devices in the UAV transportation ecosystem in a variety of formats, including within a blockchain data structure. The server (501) may access this data by requesting and receiving the data from one or more devices in the UAV transportation ecosystem including but not limited to a UAV (e.g., the UAV (102) of FIG. 1); computers (e.g., the computers (158) of FIG. 1) of a distributed computing network (e.g., the distributed computing network (151) of FIG. 1); a server (e.g., the server (140) of FIG. 1); and a control device (e.g., the control device (120) of FIG. 1). In another example, the server (501) is a device that has direct access to the data that indicates the one or more parameters associated with the UAV. For example, the server may be a computer that stores a database of UAV types and their parameters, or a computer that stores a copy of the blockchain data structure associated with a UAV of the type of UAV that includes the UAV parameters.

The method of FIG. 5 also includes determining (506), by the server (501) in dependence upon the search area data (505) and the one or more UAV parameters (507), the number of UAVs needed to complete a coordinated aerial search of a search area within a time limit. Determining (506), by the server (501) in dependence upon the search area data (505) and the one or more UAV parameters (507), the number of UAVs needed to complete a coordinated aerial search of a search area within a time limit may be carried out by the server (501) examining the UAV parameters (507) and a geographical search area from the search area data (505) to determine how many UAVs of the specified type of UAV it will take to complete a coordinated aerial search of the geographical search area within the time limit, and generating an indication (509) of the number of UAVs needed to complete a coordinated aerial search of a search area within a time limit. For example, the server (501) may examine the UAV parameters (507) to determine the capabilities and limitations (e.g., maximum speed) of the type of UAV, calculate a maximum or minimum geographical area (e.g., 1 square mile) that the type of UAV can search within the specified time limit (e.g., 1 hour), calculate the geographical area of the region to be searched from the search area data (505) (e.g., 10 square miles), and determine how many UAVs of the specified type it will take to complete a coordinated aerial search of the search area within the time limit. The server (501) produces, based on the number of UAVs, an indication of how many UAVs needed to complete a coordinated aerial search of the search area within the time limit. The indication (509) may be, for example, part of a response to a request message from a device in the UAV transportation ecosystem requesting a search strategy for a coordinated aerial search of a search area by a plurality of UAVs.

The method of FIG. 5 also includes partitioning (508), by the server (501), the search area into a plurality of partitions, wherein the number of partitions is equal to the number of UAVs. Partitioning (508), by the server (501), the search area into a plurality of partitions, wherein the number of partitions is equal to the number of UAVs may be carried out by the server (501) dividing a polygon representing the geographical search area obtained from the search area data (505) into a set of polygonal partitions forming a partitioned search area described by partitioning data (511). The cardinality of the set of partitions is equal to the number of UAVs in the indication (509). Each partition of the partitioned search area has an area such that the maximum distance searchable by one UAV of the type of UAV within the time limit is greater than or equal to the distance of a search path that completes an entire search of the partition. Each partition of the partitioned search area may be represented by, for example, by GPS coordinates forming vertices and edges connecting the vertices.

Figure 6B:
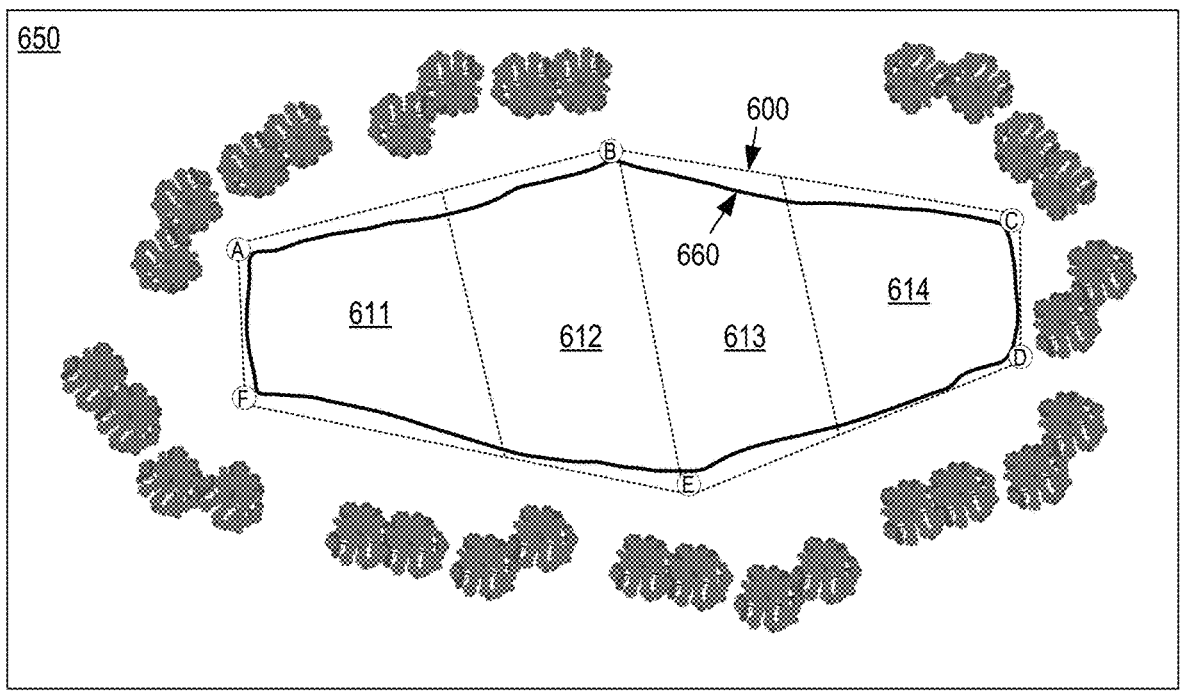
FIG. 6B is an example of partitioning a search area for coordinating an aerial search among unmanned aerial vehicles.

For further illustration, FIG. 6B also sets forth the non-limiting example of partitioning (508), by the server (501), the search area into a plurality of partitions, wherein the number of partitions is equal to the number of UAVs. FIG. 6B includes the map region (650) and the polygon (600) representing a search area perimeter (660) of FIG. 6A, as well as a set of polygonal partitions (611, 612, 613, 614). Consider that, based on the maximum search range of a type of UAV at a given speed (e.g., determined from the UAV parameters (507)) and the area of the polygon (600), it is determined at (506) that four UAVs are needed to complete a coordinated aerial search. When a user draws the search area perimeter (650), vertices (A, B, C, D, E, F) are identified from the search area perimeter (660) and connected by edges to form the polygon (600). In this example, partitioning (508), by the server (501), the search area into a plurality of partitions, wherein the number of partitions is equal to the number of UAVs may be carried out by dividing the polygon (600) into polygonal partitions (611, 612, 613, 614) having an search path length less than or equal to the maximum search range of the type of UAV.

In a particular embodiment, determining (506), by the server (501) in dependence upon the search area data (505) and the UAV parameters (507), the number of UAVs needed to complete a coordinated aerial search of a search area within a time limit and partitioning (508), by the server (501), the search area into a plurality of partitions, wherein the number of partitions is equal to the number of UAVs may be performed iteratively to reduce the number of partitions, and therefore reduce the number of UAVs needed to complete the coordinated aerial search within the time limit.

Figure 7:
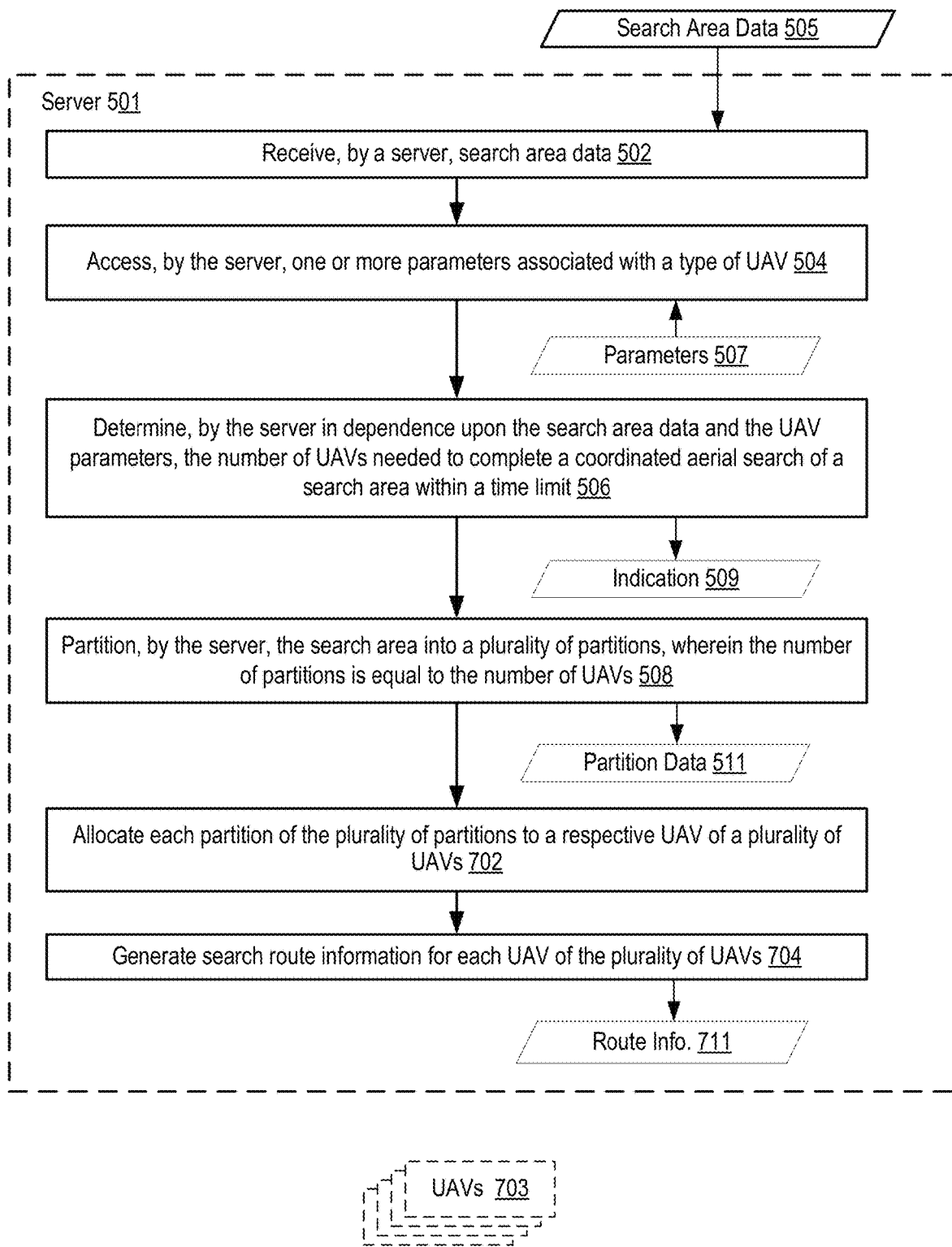
FIG. 7 is a flowchart to illustrate another implementation of a method for coordinating an aerial search among unmanned aerial vehicles.

For further explanation, FIG. 7 sets forth a flow chart illustrating an exemplary method for coordinating an aerial search among unmanned aerial vehicles according to embodiments of the present disclosure. Like the exemplary method of FIG. 5, the exemplary method of FIG. 7 also includes receiving (502), by a server in a UAV transportation ecosystem, search area data (505); accessing (504), by the server (501), one or more parameters (507) associated with a type of UAV; determining (506), by the server (501) in dependence upon the search area data (505) and the one or more UAV parameters (507), the number of UAVs needed to complete a coordinated aerial search of a search area within a time limit; and partitioning (508), by the server (501), the search area into a plurality of partitions, wherein the number of partitions is equal to the number of UAVs.

The exemplary method of FIG. 7 differs from the method of FIG. 5 in that the method of FIG. 7 further comprises allocating (702) each partition of the plurality of partitions to a corresponding UAV of a plurality of UAVs. Allocating (702) each partition of the plurality of partitions to a corresponding UAV of a plurality of UAVs may be carried out by selecting a plurality of UAVs (703) of the specified type of UAV from a fleet of available UAVs that is equal to the number of partitions identified in the search area partitioning data (511); and assigning one of the plurality of UAVs (703) to each partition, respectively. For example, each partition in the plurality of partitions (611, 612, 613,

614) in FIG. 6B would be respectively assigned to the one of the plurality of UAVs (703)

The exemplary method of FIG. 7 also from the method of FIG. 5 in that the method of FIG. 7 further comprises generating (704) search route information for each UAV of the plurality of UAVs. Generating (704) search route information for each UAV of the plurality of UAVs may be carried out by the server (501) generating route information (711) representing a respective flight path for each UAV of the plurality of UAVs (703) such that, when traversed, a particular UAV completes an aerial search of its assigned partition. The search route information may specify a starting point (e.g., an origin) and an ending point (e.g., a destination) for each UAV. Additionally, the search route information may also indicate a plurality of waypoints, zones, areas, regions between the starting point and the ending point. The search route information starting point, end point, and waypoints may be marked by GPS coordinates as well as arrival times for waypoints, and UAV control parameters such as altitude, speed, sensor operation instructions, and the like. In one embodiment, the search route information instructs the UAV to follow a flight path for conducting a sweep search of its assigned partition.

Figure 8:
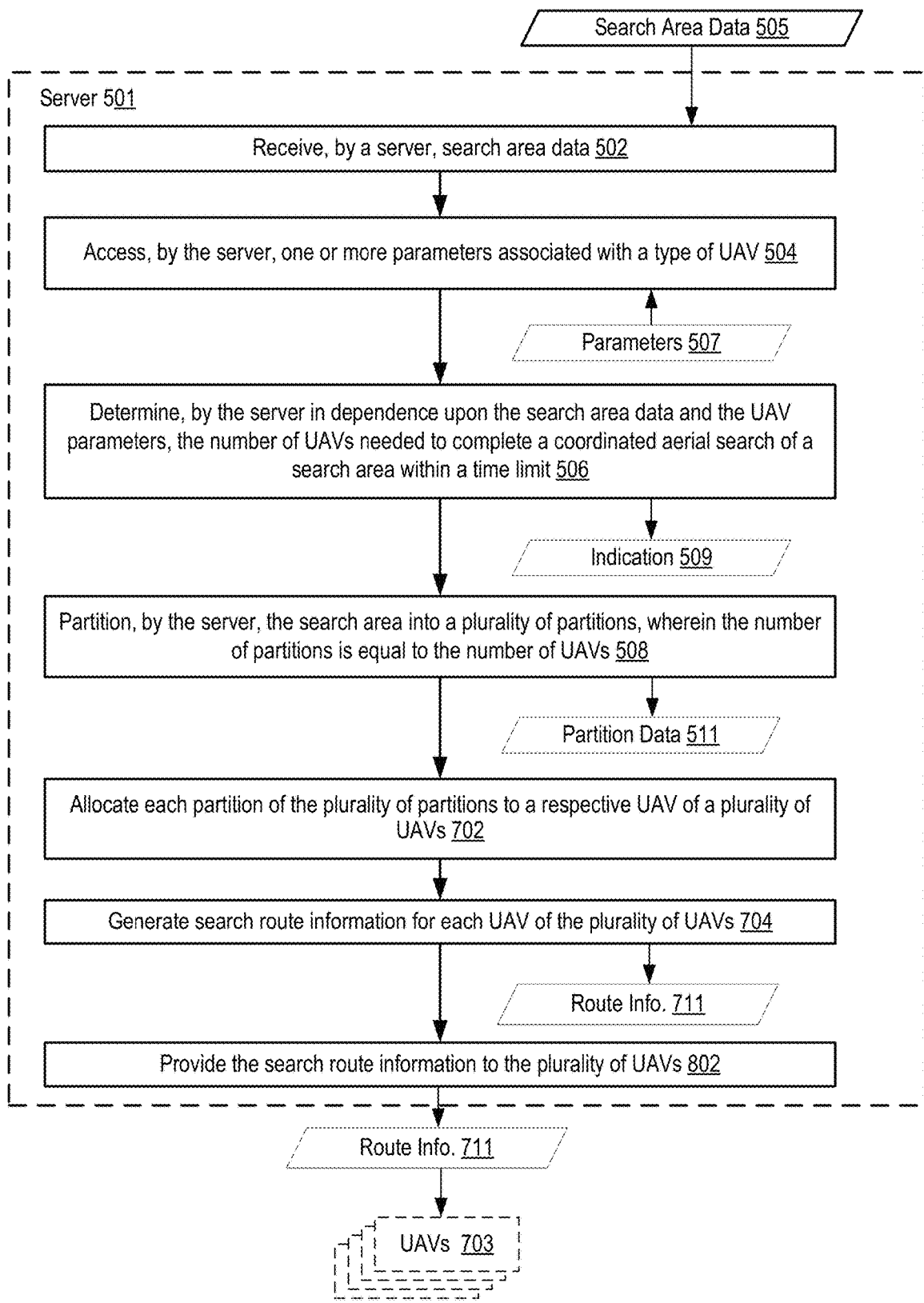
FIG. 8 is a flowchart to illustrate yet another implementation of a method for coordinating an aerial search among unmanned aerial vehicles.

For further explanation, FIG. 8 sets forth a flow chart illustrating an exemplary method for coordinating an aerial search among unmanned aerial vehicles according to embodiments of the present disclosure. Like the exemplary method of FIG. 5, the exemplary method of FIG. 8 also includes receiving (502), by a server in a UAV transportation ecosystem, search area data (505); accessing (504), by the server (501), one or more parameters (507) associated with a type of UAV; determining (506), by the server (501) in dependence upon the search area data (505) and the one or more UAV parameters (507), the number of UAVs needed to complete a coordinated aerial search of a search area within a time limit; and partitioning (508), by the server (501), the search area into a plurality of partitions, wherein the number of partitions is equal to the number of UAVs; allocating (702) each partition of the plurality of partitions to a respective UAV of a plurality of UAVs; and generating (704) search route information for each UAV of the plurality of UAVs.

The exemplary method of FIG. 8 differs from the method of FIG. 5 in that the method of FIG. 8 further comprises providing (802) the search route information to each of the plurality of UAVs. Providing (802) the search route information to each of the plurality of UAVs may be carried out by the server (501) providing respective search route information (711) to each the plurality of UAVs (703). For example, the server (501) may provide the respective search route information directly each UAV by transmitting the search route information for execution by the UAV. In another example, the server (501) may provide the respective search route information by transmitting sequential control instructions that, when received by the UAV, cause the UAV to follow a flight path represented in the search route information. In yet another example, the server (501) may provide the respective search route information by storing the search route information in a blockchain data structure associated with the UAV. The search route information (711) may include a specific set of instructions for a specific UAV, or may include route instructions for all of the UAVs participating in the coordinated aerial search with specific assignments for each UAV. The search route information (711) may also be stored in the cloud storage device (470).

Figure 9:
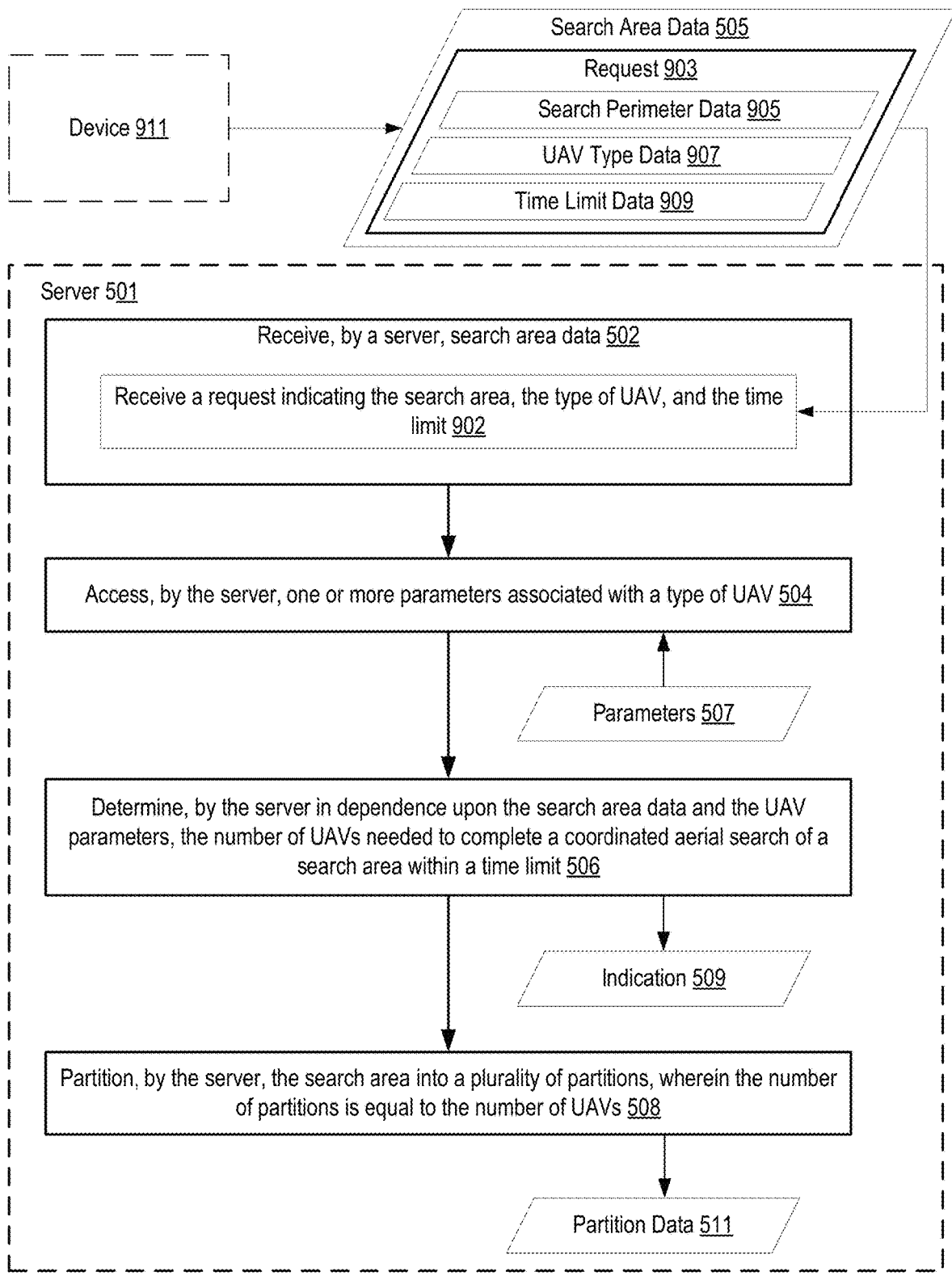
FIG. 9 is a flowchart to illustrate yet another implementation of a method for coordinating an aerial search among unmanned aerial vehicles.

For further explanation, FIG. 9 sets forth a flow chart illustrating an exemplary method for coordinating an aerial search among unmanned aerial vehicles according to embodiments of the present disclosure. Like the exemplary method of FIG. 5, the exemplary method of FIG. 9 also includes receiving (502), by a server in a UAV transportation ecosystem, search area data (505); accessing (504), by the server (501), one or more parameters (507) associated with a type of UAV; determining (506), by the server (501) in dependence upon the search area data (505) and the one or more UAV parameters (507), the number of UAVs needed to complete a coordinated aerial search of a search area within a time limit; and partitioning (508), by the server (501), the search area into a plurality of partitions, wherein the number of partitions is equal to the number of UAVs.

The exemplary method of FIG. 9 differs from the method of FIG. 5 in that receiving (502), by a server in a UAV transportation ecosystem, search area data (505) includes receiving (902) a request message (903) including search perimeter data (905), UAV type data (907), and time limit data (909). Receiving (902) a request message (903) including search perimeter data (905), UAV type data (907), and time limit data (909) may be carried out by a requesting device (911) in the UAV transportation ecosystem generating a request message (903) that includes the search perimeter data (905) specifying a geographical search area; the UAV type data (907) specifying the type of the UAVs that will participate in a coordinated aerial search of the geographical search area; and the time limit data (909) specifying the amount of time within which the coordinated aerial search shall be competed. For example, the search perimeter data (905) may include a set of GPS points that, when connected in a path, form the perimeter of the geographical search area; the UAV type data (907) may include a manufacturer, model number, serial number, class, range, and combinations thereof; and the time limit data (909) may include a number of minutes, hours, and/or days within which the search must be completed.

Figure 10:
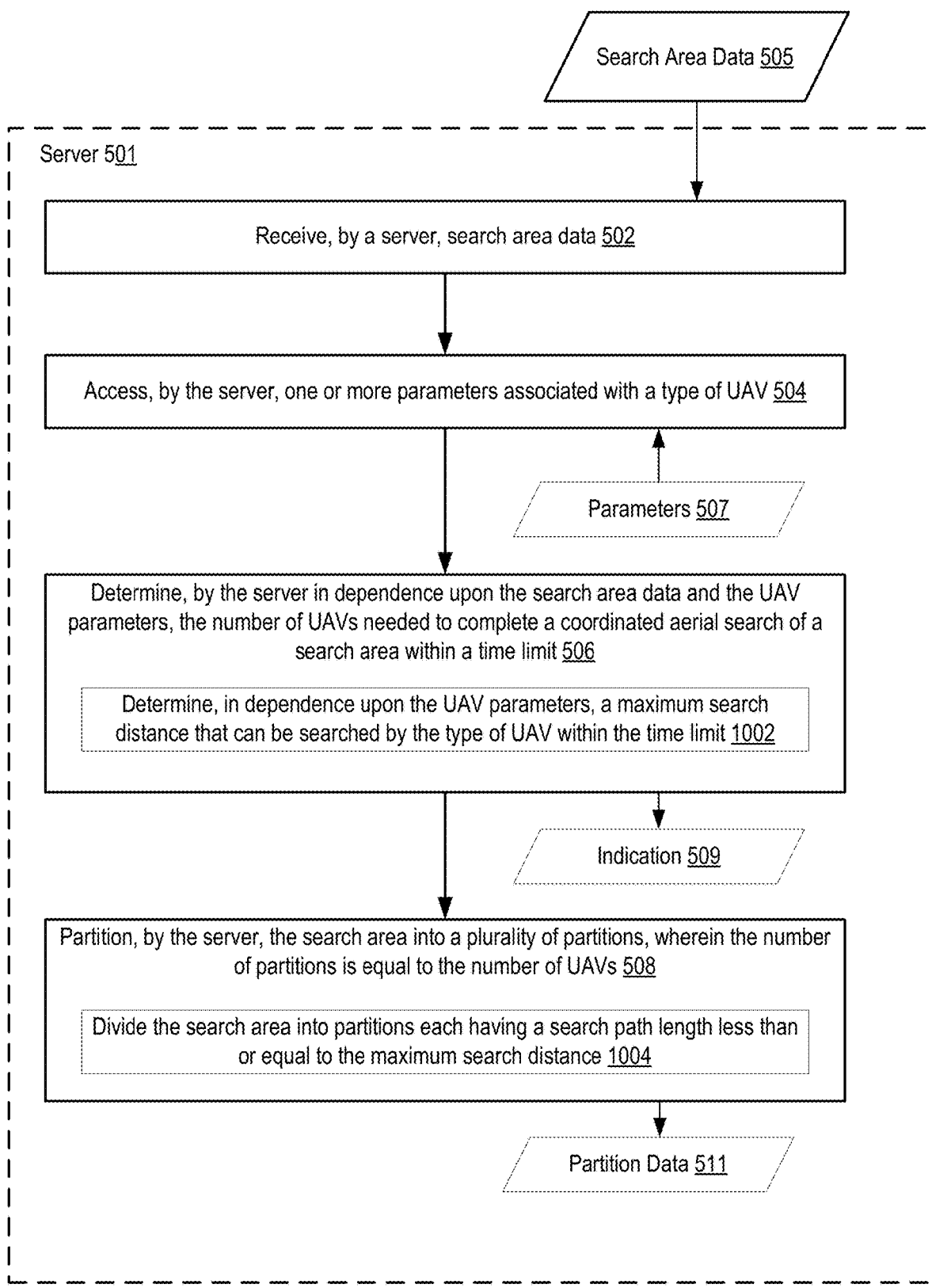
FIG. 10 is a flowchart to illustrate yet another implementation of a method for coordinating an aerial search among unmanned aerial vehicles.

For further explanation, FIG. 10 sets forth a flow chart illustrating an exemplary method for coordinating an aerial search among unmanned aerial vehicles according to embodiments of the present disclosure. Like the exemplary method of FIG. 5, the exemplary method of FIG. 10 also includes receiving (502), by a server in a UAV transportation ecosystem, search area data (505); accessing (504), by the server (501), one or more parameters (507) associated with a type of UAV; determining (506), by the server (501) in dependence upon the search area data (505) and the one or more UAV parameters (507), the number of UAVs needed to complete a coordinated aerial search of a search area within a time limit; and partitioning (508), by the server (501), the search area into a plurality of partitions, wherein the number of partitions is equal to the number of UAVs.

The exemplary method of FIG. 10 differs from the method of FIG. 5 in that determining (506), by the server (501) in dependence upon the search area data (505) and the UAV parameters (507) includes determining (1002), in dependence upon the UAV parameters, an area that can be searched by the type of UAV within the time limit. Determining (1002), in dependence upon the UAV parameters, an area that can be searched by the type of UAV within the time limit may be carried out by the server (501) examining the UAV parameters (507) associated with the type of UAV (e.g., maximum range, maximum runtime, maximum speed, sensor parameters, etc.) and calculating a maximum distance (e.g., maximum range) that the type of UAV can travel (i.e., search) within the specified time limit.

For example, the server (501) may examine the UAV parameters (507) to determine that a particular type of UAV has a maximum speed of 60 kilometer per hour (km/hr). In this example, server (501) may also determine, from the search area data (505), that a search path that competes a search of the search area is 120 km, and therefore two UAVs are needed to search the search area with a time limit of one hour. In a particular embodiment, the server (501) determines, from the search area data (505), a polygon representing a geographical search area. The server (501) then determines the length of the of a sweep search pattern that traverses the polygon such that a sensor (e.g., a camera) on the type of UAV is able to capture, through passes of the sweep search pattern, an aerial view of the totality of the geographical search area. The server (501) may examine the UAV parameters (507) to determine that, at a particular altitude, a sensor (e.g., a camera) is capable of a 1 km wide field of view. Based on the parameters (507) of the type of UAV, the server (501) determines how many UAVs of the type of UAV would be needed to perform a coordinated aerial search of the geographic search area.

The exemplary method of FIG. 10 also differs from the method of FIG. 5 in that partitioning (508), by the server (501), the search area into a plurality of partitions, wherein the number of partitions is equal to the number of UAVs includes dividing (1004) the search area into a plurality of partitions each having a search path length less than or equal to the maximum search distance. Dividing (1004) the search area into partitions each having a search path length less than or equal to the maximum search distance may be carried out by the server (501) generating search area partitioning data (511) such that the type of UAV can perform an aerial search of any partition within the given time limit. That is, the search area is divided into partitions such the length of a search path in each partition is less than or equal to the maximum search distance of the UAV. The search path length associated with each partition is the distance traveled in a flight path that completes an aerial search of the partition (i.e., the distance traveled by the UAV in performing a complete search of the partition).

Referring to FIG. 6B, the polygon (600) representing the geographical search area is partitioned into polygonal partitions (611, 612, 613, 614) such that a UAV of the type of UAV is capable of searching any of the polygonal partitions (611, 612, 613, 614) within the time limit based on the maximum distance that the UAV can search within the time limit. In a particular example, the server (501) determines a sweep search pattern that traverses the polygon (600) such that a sensor (e.g., a camera) on the UAV is able to capture a view of the entire area within the polygon (600). The server (501) then determines how much of that sweep search pattern the UAV would be able to complete within the time limit. The polygon (600) is then partitioned such that each UAV performing the coordinated aerial search does not traverse the sweep search path for a distance longer than it can travel within the given time limit. That is, each of the plurality of UAVs performing the coordinated aerial search traverses a portion of the sweep search path, wherein each portion of the sweep search path allocated to each UAV is less than or equal to a distance that each UAV of the type of UAV can travel within the time limit.

Figure 11:
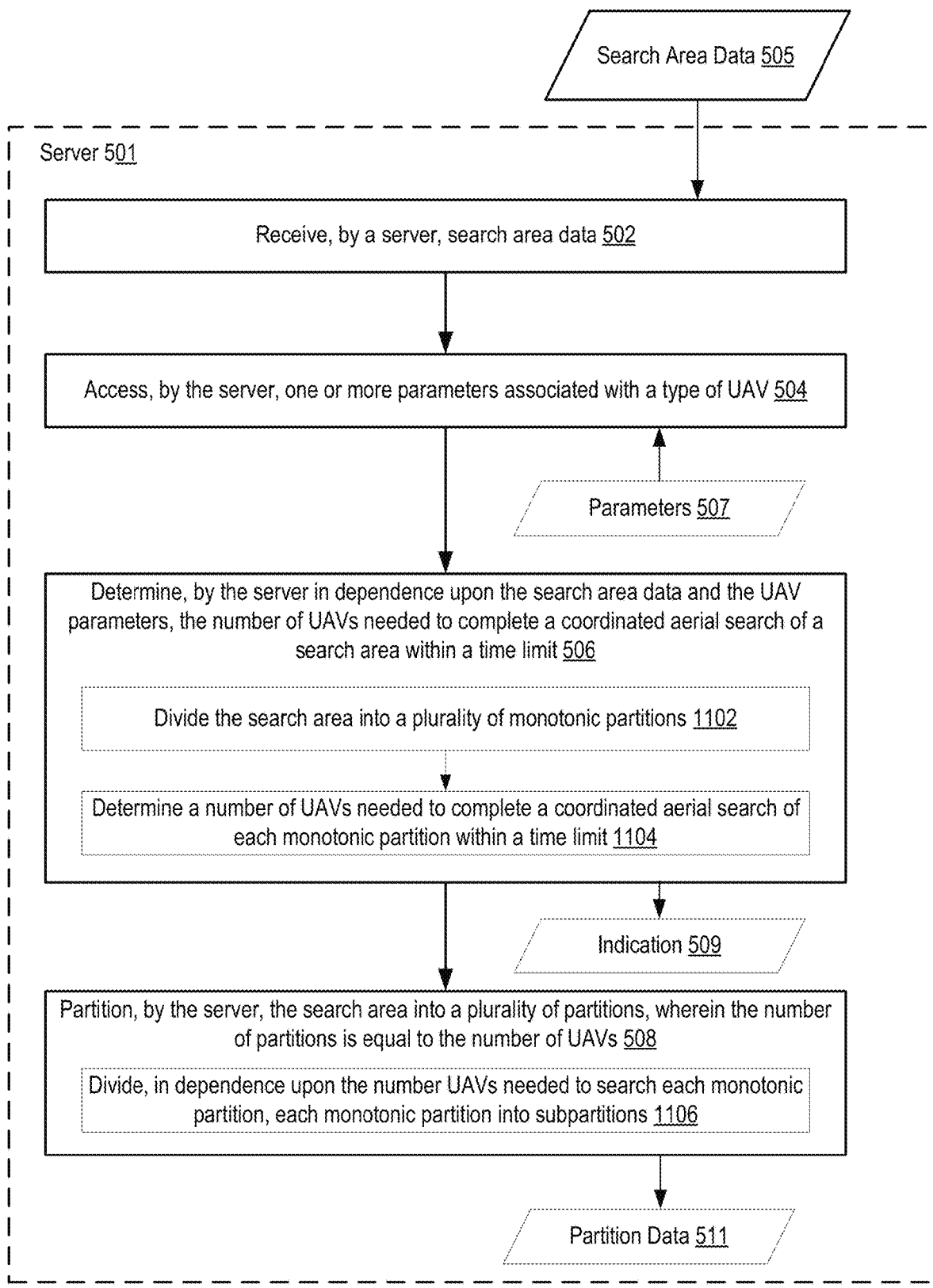
FIG. 11 is a flowchart to illustrate yet another implementation of a method for coordinating an aerial search among unmanned aerial vehicles.

For further explanation, FIG. 11 sets forth a flow chart illustrating an exemplary method for coordinating an aerial search among unmanned aerial vehicles according to embodiments of the present disclosure. Like the exemplary method of FIG. 5, the exemplary method of FIG. 11 also includes receiving (502), by a server in a UAV transportation ecosystem, search area data (505); accessing (504), by the server (501), one or more parameters (507) associated with a type of UAV; determining (506), by the server (501) in dependence upon the search area data (505) and the one or more UAV parameters (507), the number of UAVs needed to complete a coordinated aerial search of a search area within a time limit; and partitioning (508), by the server (501), the search area into a plurality of partitions, wherein the number of partitions is equal to the number of UAVs.

The exemplary method of FIG. 11 differs from the method of FIG. 5 in that determining (506), by the server (501) in dependence upon the search area data (505) and the UAV parameters (507) includes dividing (1102) the search area into a plurality of monotonic partitions. Dividing (1102) the search area into a plurality of monotonic partitions may be carried out by the server (501) dividing a polygon representing the geographic search into a plurality of monotone polygons such that, with respect to a straight line L, every line orthogonal to L intersects a polygon P at most twice. For example, the server (501) analyzes the polygon to determine where partition lines should be drawn such that each partition forms a monotone polygon.

The exemplary method of FIG. 11 differs also from the method of FIG. 5 in that determining (506), by the server (501) in dependence upon the search area data (505) and the UAV parameters (507) further includes determining (1104) a number of UAVs needed to complete a coordinated aerial search of each monotonic partition within a time limit. Determining (1104) a number of UAVs needed to complete a coordinated aerial search of each monotonic partition within a time limit may be carried out by the server (501) determining, for each monotone polygon, the length of a sweep search pattern that traverses the polygon such that a sensor (e.g., a camera) on the UAV is able capture a view of the entire area within the polygon. For example, through passes of the sweep search pattern, the UAV can capture an aerial view of the totality of the monotone polygon. Based on the parameters (507) (e.g., maximum speed) of the type of UAV, the server (501) determines how many UAVs of the type of UAV would be needed to perform a coordinated aerial search of the geographic search area within the monotone polygon by determining how many UAVs would be required to complete the sweep search path within the time limit. As a particular example, a monotone polygon may require a 120 km search path, and a UAV of the type of UAV may have a maximum speed of 60 km/hr; therefore, two UAVs would be needed to complete the search path within a time limit of one hour.

Figure 12A:
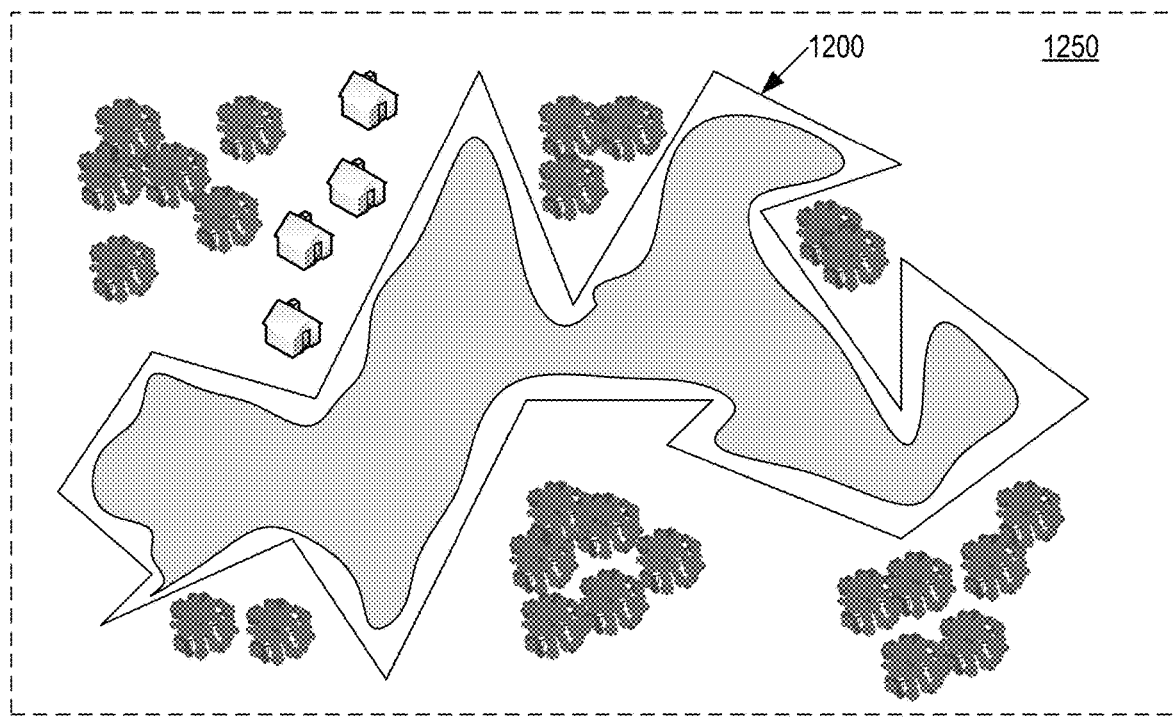
FIG. 12A is another exemplary search area for coordinating an aerial search among unmanned aerial vehicles.
Figure 12B:
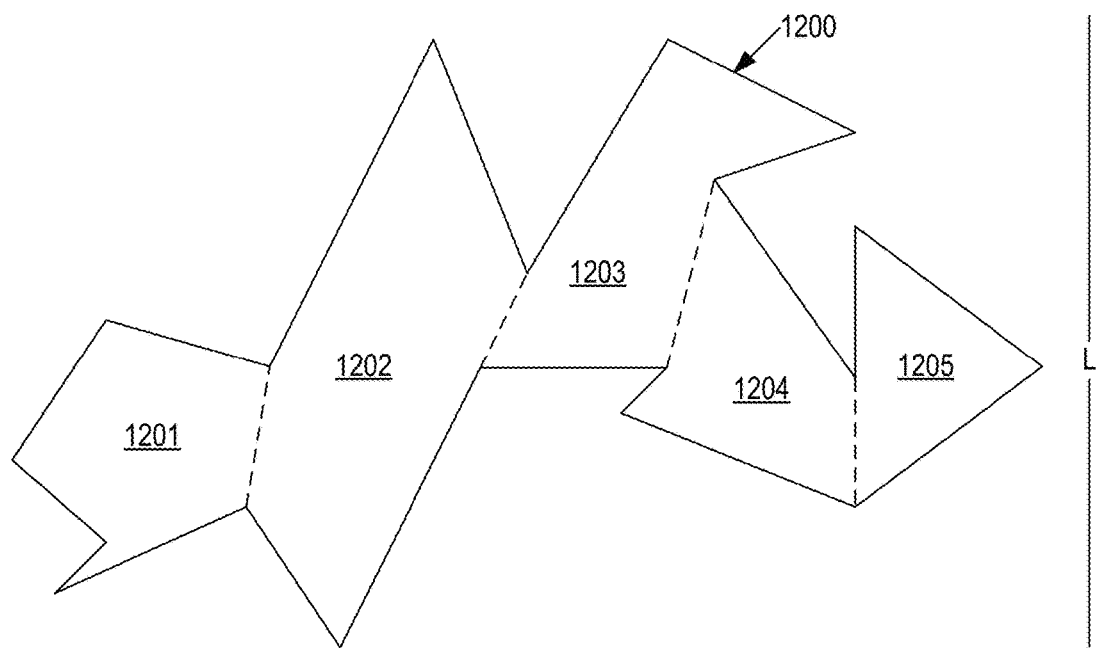
FIG. 12B is another example of partitioning a search area for coordinating an aerial search among unmanned aerial vehicles.

For further illustration, FIGS. 12A and 12B illustrate a non-limiting example of dividing (1102) the search area into a plurality of monotonic partitions and determining (1104) a number of UAVs needed to complete a coordinated aerial search of each monotonic partition within a time limit. Dividing (1102) the search area into a plurality of monotonic partitions. FIG. 12A illustrates an example polygon (1200) representing a geographical search area in a map region (1250). The server (501) (e.g., using methodology for identifying monotonic sections of a polygon that will be recognized by those of skill in the art) partitions the polygon (1200) into monotone polygons (1201, 1202, 1203, 1204, 1205) as illustrated in FIG. 12B. The server (501) may then determine a flight path for a sweep pattern that, when executed by one or more UAVs, captures a complete aerial view of the geographical search area within the monotonic partition (i.e., each monotone polygon (1201, 1202, 1203, 1204, 1205)). Based on a length (i.e., distance) of the flight path and the UAV parameter (507), the server (501) determines how many UAVs of the specified type of UAV would be needed to complete the search of the geographic area represented by each monotone polygon (1201, 1202, 1203, 1204, 1205).

The exemplary method of FIG. 11 also differs from the method of FIG. 5 in that partitioning (508), by the server (501), the search area into a plurality of partitions includes dividing (1106), in dependence upon the number UAVs needed to search each monotonic partition, each monotonic partition into subpartitions. Dividing (1106), in dependence upon the number UAVs needed to search each monotonic partition, each monotonic partition into subpartitions, may be carried out by the server (501) dividing each monotonic partition into subpartitions such that each UAV is able to complete a portion of a sweep search flight path within a corresponding subpartition within the given time limit. That is, during a coordinated aerial search of the geographic search area within each monotonic partition, the monotonic partition is subdivided into a number of subparts equal to the number of UAVs needed to complete the search within the time limit, where each UAV can complete an aerial search of its assigned subpart within the time limit. Thus, each UAV performing the coordinated aerial search does not traverse the sweep search path for a distance longer than it can travel within the given time limit. That is, the plurality of UAVs performing the coordinated aerial search each within a subpartition of a monotonic partition traverses a portion of the sweep search path, wherein each portion of the sweep search path allocated to each UAV is less than or equal to a distance that each UAV of the type of UAV can travel within the time limit.

Figure 12C:
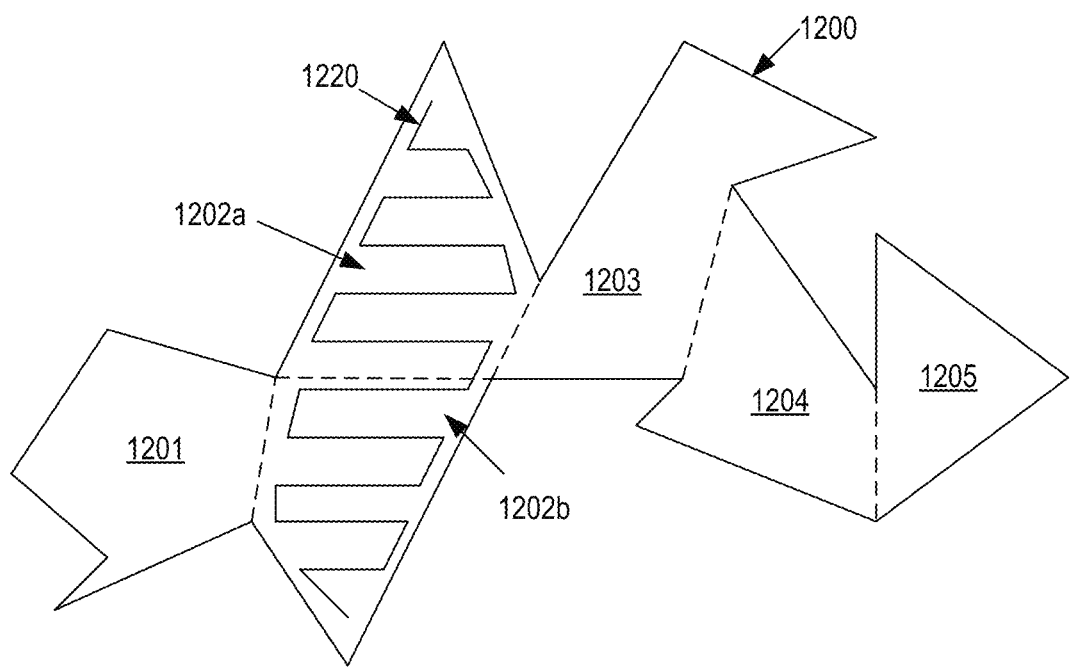
FIG. 12C is an example of further partitioning a search area for coordinating an aerial search among unmanned aerial vehicles.

For further illustration, FIG. 12C continues the non-limiting example of FIGS. 12A and 12B, and illustrates an example of dividing (1106), in dependence upon the number UAVs needed to search each monotonic partition, each monotonic partition into subpartitions. In FIG. 12C, the polygon (1200) representing the geographical search area is partitioned into monotone polygons (1201, 1202, 1203, 1204, 1205). After determining (1104) a number of UAVs needed to complete a coordinated aerial search of each monotonic partition within a time limit, the server (501) determines a sweep search path for each monotone polygons (1201, 1202, 1203, 1204, 1205), compares the length of each search path to the distance each UAV can cover, and subdivides each monotone polygons (1201, 1202, 1203, 1204, 1205), if applicable, into subpartitions such that each UAV is capable of searching each subpartition within the time limit based. For example, in FIG. 12C, the server (501) may determine that, of the five monotonic partitions (1201, 1202, 1203, 1204, 1205), only one UAV each is needed to search four of the monotonic partitions (1201, 1203, 1204, 1205), but two UAVs are needed to search a fifth monotonic partition (1202). Thus, a total of six UAVs will be needed to search the geographic area constrained by the polygon (1200) within the time limit. The server (501) may determine the length (e.g., 120 km) of the sweep search flight path (1220) of the fifth monotonic partition (1202), compare the length of the sweep search path to a maximum distance (e.g., 60 km) that a UAV of the specified type of UAV can travel, and divide the particular monotonic partition (1202) into subpartitions (1202a, 1202b) based on the length of the sweep search path and the maximum distance the UAV can travel. In this example, two UAVs performing a coordinated aerial search can complete the sweep search path within the given time limit, such that a first UAV may be designated to complete the portion of the sweep search path (1220) in a first subpartition (1202a), and a second UAV is designated to complete the portion of the sweep search path (1220) in the second subpartition (1202b).

Figure 13:
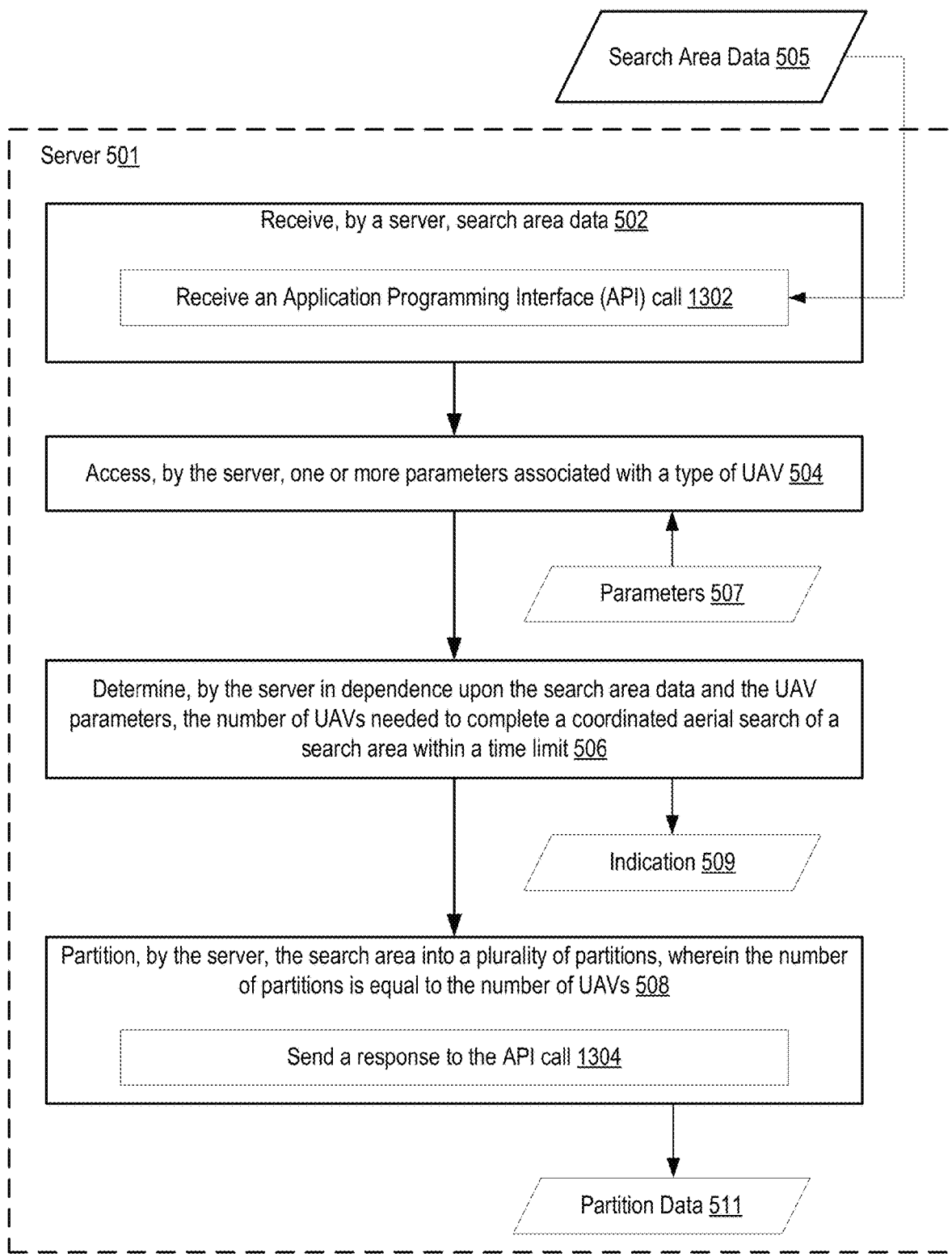
FIG. 13 is a flowchart to illustrate yet another implementation of a method for coordinating an aerial search among unmanned aerial vehicles.

For further explanation, FIG. 13 sets forth a flow chart illustrating an exemplary method for coordinating an aerial search among unmanned aerial vehicles according to embodiments of the present disclosure. Like the exemplary method of FIG. 5, the exemplary method of FIG. 13 also includes receiving (502), by a server in a UAV transportation ecosystem, search area data (505); accessing (504), by the server (501), one or more parameters (507) associated with a type of UAV; determining (506), by the server (501) in dependence upon the search area data (505) and the one or more UAV parameters (507), the number of UAVs needed to complete a coordinated aerial search of a search area within a time limit; and partitioning (508), by the server (501), the search area into a plurality of partitions, wherein the number of partitions is equal to the number of UAVs.

The exemplary method of FIG. 13 differs from the method of FIG. 5 in that receiving (502), by a server in a UAV transportation ecosystem, search area data (505) includes receiving (1302) an API call. The server (501) may expose, to other devices in the UAV transportation ecosystem (e.g., the client device (450) of FIG. 4), an API for requesting data related to a search strategy for a coordinated aerial search of a search area. The API call may include delimiters, parameters, or other attributes to specify the search data (505) provided to the server (501). For example, the API call may specify a geographic search area, a type of UAV, and a time limit. Thus, a device such as the client device (450) may invoke an API call to the server (403) to provide partitioning data (511) indicating the parameters relevant for a coordinated aerial search strategy for UAVs.

The method of FIG. 13 further differs from FIG. 5 in that partitioning (508), by the server (501), the search area into a plurality of partitions, wherein the number of partitions is equal to the number of UAVs includes sending (1304) a response to the API call comprising the partitioning data (511). For example, the server (501) may send a response to the API call to the client device (450), a UAV, or another device in order to provide the partitioning data (511) relevant to a coordinated aerial search strategy for a plurality of UAVs.

Exemplary embodiments of the present invention are described largely in the context of a fully functional computer system for coordinating an aerial search among unmanned aerial vehicles. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or Verilog), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for coordinating an aerial search among unmanned aerial vehicles, the method comprising:
    receiving from a device, by a server in an unmanned aerial vehicle (UAV) transportation ecosystem, search area data including a set of global positioning system (GPS) coordinates, a type of UAV, and a time limit;
    generating, by the server based on the set of GPS coordinates, a search area polygon;
    determining, by the server, that vertices of the search area polygon define two or more monotone polygons;
    partitioning, by the server, the search area polygon into two or more monotonic partitions in accordance with the two or more monotone polygons;
    determining, by the server, a total number of UAVs needed to complete a sweep search of the two or more monotonic partitions within the time limit based on UAV parameters of the type of UAV, wherein the UAV parameters include a maximum speed for the type of UAV, a maximum runtime for the type of UAV, and a power consumption relationship between speed and runtime for the type of UAV;
    generating, by the server based on the total number of UAVs needed, UAV route instructions for executing a sweep search path in each of the two more monotonic partitions; and
    controlling, by the server, a set of UAVs in performing a coordinated aerial search of the two or more monotonic partitions based on the UAV route instructions, the set of UAVs having the total number of UAVs needed to complete a sweep search of the two or more monotonic partitions within the time limit.

2. The method of claim 1, further comprising:
    allocating each UAV to one monotonic partition; and
    generating search route information for each UAV of the set of UAVs.

3. The method of claim 1, wherein determining, by the server, a total number of UAVs needed to complete a sweep search of the two or more monotonic partitions within the time limit based on the UAV parameters of the type of UAV, wherein the UAV parameters include a maximum speed for the type of UAV, a maximum runtime for the type of UAV, and a power consumption relationship between speed and runtime for the type of UAV includes:
    determining a number of UAVs needed to complete a coordinated aerial search of a particular monotonic partition within the time limit; and
    dividing, in dependence upon the number UAVs needed to search the particular monotonic partition, the particular monotonic partition into subpartition.

4. The method of claim 1, wherein receiving, by a server of a UAV transportation ecosystem, search area data includes receiving an Application Program Interface (API) call.

5. An apparatus for coordinating an aerial search among unmanned aerial vehicles, the apparatus comprising:
    a processor; and
    a memory storing instructions, the instructions executable by the processor to:
        receive from a device, by a server in an unmanned aerial vehicle (UAV) transportation ecosystem, search area data including a set of global positioning system (GPS) coordinates, a type of UAV, and a time limit;
        generate, by the server based on the set of GPS coordinates, a search area polygon;
        determine, by the server, that vertices of the search area polygon define two or more monotone polygons;
        partition, by the server, the search area polygon into two or more monotonic partitions in accordance with the two or more monotone polygons;
        determine, by the server, a total number of UAVs needed to complete a sweep search of the two or more monotonic partitions within the time limit based on UAV parameters of the type of UAV, wherein the UAV parameters include a maximum speed for the type of UAV, a maximum runtime for the type of UAV, and a power consumption relationship between speed and runtime for the type of UAV;
        generate, by the server based on the total number of UAVs needed, UAV route instructions for executing a sweep search path in each of the two more monotonic partitions; and
        control, by the server, a set of UAVs in performing a coordinated aerial search of the two or more monotonic partitions based on the UAV route instructions, the set of UAVs having the total number of UAVs needed to complete a sweep search of the two or more monotonic partitions within the time limit.

6. The apparatus of claim 5, further comprising instructions executable by the processor to:
    allocate UAV to one monotonic partition; and
    generate search route information for each UAV of the set of UAVs.

7. The apparatus of claim 5, wherein determining, by the server, a total number of UAVs needed to complete a sweep search of the two or more monotonic partitions within the time limit based on the UAV parameters of the type of UAV, wherein the UAV parameters include a maximum speed for the type of UAV, a maximum runtime for the type of UAV, and a power consumption relationship between speed and runtime for the type of UAV includes:
    determining a number of UAVs needed to complete a coordinated aerial search of a particular monotonic partition within the time limit; and
    dividing, in dependence upon the number UAVs needed to search the particular monotonic partition, the particular monotonic partition into subpartitions.

8. The apparatus of claim 5, wherein receiving, by a server of a UAV transportation ecosystem, search area data includes receiving an Application Program Interface (API) call.

9. A non-transitory computer-readable medium for coordinating an aerial search among unmanned aerial vehicles, the computer-readable medium storing instructions that, when executed by a processor, cause the processor to perform operations, the operations comprising:

receiving from a device, by a server in an unmanned aerial vehicle (UAV) transportation ecosystem, search area data including a set of global positioning system (GPS) coordinates, a type of UAV, and a time limit;

generating, by the server based on the set of GPS coordinates, a search area polygon;

determining, by the server, that vertices of the search area polygon define two or more monotone polygons;

partitioning, by the server, the search area polygon into two or more monotonic partitions in accordance with the two or more monotone polygons;

determining, by the server, a total number of UAVs needed to complete a sweep search of the two or more monotonic partitions within the time limit based on UAV parameters of the type of UAV, wherein the UAV parameters include a maximum speed for the type of UAV, a maximum runtime for the type of UAV, and a power consumption relationship between speed and runtime for the type of UAV;

generating, by the server based on the total number of UAVs needed, UAV route instructions for executing a sweep search path in each of the two more monotonic partitions; and controlling, by the server, a set of UAVs in performing a coordinated aerial search of the two or more monotonic partitions based on the UAV route instructions, the set of UAVs having the total number of UAVs needed to complete a sweep search of the two or more monotonic partitions within the time limit.

10. The computer-readable medium of claim 9, further comprising instructions that, when executed by a processor, cause the processor to perform operations comprising:

allocating each UAV to one monotonic partition; and generating search route information for each UAV of the set of UAVs.

11. The computer-readable medium of claim 9, wherein determining, by the server, a total number of UAVs needed to complete a sweep search of the two or more monotonic partitions within the time limit based on the UAV parameters of the type of UAV, wherein the UAV parameters include a maximum speed for the type of UAV, a maximum runtime for the type of UAV, and a power consumption relationship between speed and runtime for the type of UAV includes:

determining a number of UAVs needed to complete a coordinated aerial search of a particular monotonic partition within the time limit; and dividing, in dependence upon the number UAVs needed to search the particular monotonic partition, the particular monotonic partition into subpartitions.

* * * * *